(12) United States Patent
Walters et al.

(10) Patent No.: US 11,474,978 B2
(45) Date of Patent: Oct. 18, 2022

(54) SYSTEMS AND METHODS FOR A DATA SEARCH ENGINE BASED ON DATA PROFILES

(71) Applicant: CAPITAL ONE SERVICES, LLC, McLean, VA (US)

(72) Inventors: Austin Walters, Savoy, IL (US);
Vincent Pham, Champaign, IL (US);
Galen Rafferty, Mahomet, IL (US);
Anh Truong, Champaign, IL (US);
Mark Watson, Urbana, IL (US);
Jeremy Goodsitt, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/405,956

(22) Filed: May 7, 2019

(65) Prior Publication Data
US 2020/0012626 A1 Jan. 9, 2020

Related U.S. Application Data

(60) Provisional application No. 62/694,968, filed on Jul. 6, 2018.

(51) Int. Cl.
*G06F 16/21* (2019.01)
*G06F 16/2458* (2019.01)
(Continued)

(52) U.S. Cl.
CPC ........ *G06F 16/211* (2019.01); *G06F 9/30036* (2013.01); *G06F 16/2468* (2019.01); *G06F 16/285* (2019.01)

(58) Field of Classification Search
CPC .. G06F 16/211; G06F 16/2468; G06F 16/285; G06F 9/30036; G06N 3/00–126; G06N 5/00–048; G06N 7/00–08
See application file for complete search history.

(56) References Cited

U.S. PATENT DOCUMENTS 5,911,139 A * 6/1999 Jain .................. G06F 16/58
5,915,250 A * 6/1999 Jain .................. G06F 16/58
(Continued)

FOREIGN PATENT DOCUMENTS

CA         2507309 A1 * 11/2005  ............. G06F 16/36

OTHER PUBLICATIONS

Matthias Feurer, Jost Tobias Springenberg, Aaron Klein, Manuel Blum, Katharina Eggensperger, and Frank Hutter, "Efficient and Robust Automated Machine Learning", Advances in Neural Information Processing Systems 28 (Dec. 2015) http://papers.nips.cc/paper/5872-efficient-and-robust-automated-machine-learning.pdf accessed May 7, 2019, 9 pp.

(Continued)

*Primary Examiner* — Neveen Abel Jalil
*Assistant Examiner* — Hubert Cheung
(74) *Attorney, Agent, or Firm* — Finnegan, Henderson, Farabow, Garrett & Dunner, LLP

(57) ABSTRACT

Systems and methods for searching data are disclosed. For example, the system may include one or more memory units storing instructions and one or more processors configured to execute the instructions to perform operations. The operations may include receiving a sample dataset and identifying a data schema of the sample dataset. The operations may include generating a sample data vector that includes statistical metrics of the sample dataset and information based on the data schema of the sample dataset. The operations may include searching a data index comprising a plurality of stored data vectors corresponding to a plurality of reference datasets. The stored data vectors may include statistical metrics of the reference datasets and information based on corresponding data schema. The operations may include generating, based on the search and the sample data vector, (Continued)

one or more similarity metrics of the sample dataset to individual ones of the reference datasets.

19 Claims, 6 Drawing Sheets

(51) Int. Cl.
  *G06F 16/28* (2019.01)
  *G06F 9/30* (2018.01)

(56) References Cited

U.S. PATENT DOCUMENTS

| | | | |
|---|---|---|---|
| 5,974,549 | A | 10/1999 | Golan |
| 6,137,912 | A | 10/2000 | Kostrzewski et al. |
| 6,269,351 | B1 | 7/2001 | Black |
| 6,456,990 | B1 | 9/2002 | Hofmann et al. |
| 7,788,191 | B2 | 8/2010 | Jebara |
| 7,953,682 | B2 | 5/2011 | Smith et al. |
| 8,375,014 | B1* | 2/2013 | Brocato ............... G06F 16/213 707/705 |
| 8,375,032 | B2 | 2/2013 | Birdwell et al. |
| 8,392,418 | B2 | 3/2013 | Birdwell et al. |
| 8,484,215 | B2* | 7/2013 | Anderson ............ G06N 20/00 707/737 |
| 8,548,951 | B2 | 10/2013 | Solmer et al. |
| 8,706,659 | B1 | 4/2014 | Mann et al. |
| 8,782,744 | B1 | 7/2014 | Fuller et al. |
| 8,990,236 | B2* | 3/2015 | Mizrahy ............... G06F 16/367 707/759 |
| 9,171,146 | B2 | 10/2015 | Vipat et al. |
| 9,274,935 | B1 | 3/2016 | Lachwani et al. |
| 9,462,013 | B1 | 10/2016 | Boss et al. |
| 9,497,202 | B1 | 11/2016 | Calo et al. |
| 9,608,809 | B1 | 3/2017 | Ghetti et al. |
| 9,678,999 | B1* | 6/2017 | Gibas ............... G06F 16/24545 |
| 9,716,842 | B1 | 7/2017 | Worley et al. |
| 9,754,190 | B1 | 9/2017 | Guttmann |
| 9,886,247 | B2 | 2/2018 | Laredo et al. |
| 9,912,698 | B1 | 3/2018 | Thioux et al. |
| 9,954,893 | B1 | 4/2018 | Zhao et al. |
| 10,122,969 | B1 | 11/2018 | Lim et al. |
| 10,212,428 | B2 | 2/2019 | Trepte |
| 10,282,907 | B2 | 5/2019 | Miller et al. |
| 10,453,220 | B1 | 10/2019 | Mihai et al. |
| 2002/0103793 | A1 | 8/2002 | Koller et al. |
| 2003/0003861 | A1 | 1/2003 | Kagemoto et al. |
| 2003/0037025 | A1* | 2/2003 | Aggarwal ............ G06F 16/285 |
| 2003/0074368 | A1 | 4/2003 | Schuetze et al. |
| 2005/0278139 | A1* | 12/2005 | Glaenzer ............ G06K 9/6292 702/179 |
| 2006/0031622 | A1 | 2/2006 | Jardine |
| 2006/0053133 | A1* | 3/2006 | Parkinson ............ G06F 40/216 |
| 2006/0155697 | A1* | 7/2006 | Rosengard ......... G06F 16/2454 |
| 2006/0242142 | A1* | 10/2006 | Coen ................ G06F 16/258 |
| 2007/0169017 | A1 | 7/2007 | Coward |
| 2007/0271287 | A1* | 11/2007 | Acharya ............... G06F 16/285 |
| 2007/0282824 | A1* | 12/2007 | Ellingsworth ........ G06F 16/313 707/999.005 |
| 2008/0133573 | A1* | 6/2008 | Haft .................. G06F 16/2428 |
| 2008/0168339 | A1 | 7/2008 | Hudson et al. |
| 2008/0270363 | A1 | 10/2008 | Hunt et al. |
| 2008/0288889 | A1 | 11/2008 | Hunt et al. |
| 2009/0018996 | A1 | 1/2009 | Hunt et al. |
| 2009/0055331 | A1 | 2/2009 | Stewart |
| 2009/0055477 | A1 | 2/2009 | Flesher et al. |
| 2009/0110070 | A1 | 4/2009 | Takahashi et al. |
| 2009/0254971 | A1* | 10/2009 | Herz ................. G06Q 10/10 726/1 |
| 2010/0251340 | A1 | 9/2010 | Martin et al. |
| 2010/0254627 | A1 | 10/2010 | Tehrani et al. |
| 2010/0332210 | A1 | 12/2010 | Birdwell et al. |
| 2010/0332474 | A1* | 12/2010 | Birdwell ............. G06F 16/285 707/E17.089 |
| 2012/0066214 | A1* | 3/2012 | Nelke ................. G06F 16/258 707/723 |
| 2012/0174224 | A1 | 7/2012 | Thomas et al. |
| 2012/0284213 | A1 | 11/2012 | Lin et al. |
| 2013/0117830 | A1 | 5/2013 | Erickson et al. |
| 2013/0124526 | A1 | 5/2013 | Birdwell |
| 2013/0159309 | A1 | 6/2013 | Birdwell et al. |
| 2013/0159310 | A1 | 6/2013 | Birdwell et al. |
| 2013/0167192 | A1 | 6/2013 | Hickman et al. |
| 2014/0053061 | A1 | 2/2014 | Chasen et al. |
| 2014/0195466 | A1 | 7/2014 | Phillipps et al. |
| 2014/0201126 | A1 | 7/2014 | Zadeh et al. |
| 2014/0278339 | A1 | 9/2014 | Aliferis et al. |
| 2014/0324760 | A1 | 10/2014 | Marwah et al. |
| 2014/0325662 | A1 | 10/2014 | Foster et al. |
| 2014/0365549 | A1 | 12/2014 | Jenkins |
| 2015/0032761 | A1 | 1/2015 | Pasternack |
| 2015/0058388 | A1 | 2/2015 | Smigelski |
| 2015/0066793 | A1 | 3/2015 | Brown |
| 2015/0100537 | A1 | 4/2015 | Grieves et al. |
| 2015/0220734 | A1 | 8/2015 | Nalluri et al. |
| 2015/0241873 | A1 | 8/2015 | Goldenberg et al. |
| 2015/0309987 | A1 | 10/2015 | Epstein et al. |
| 2016/0019271 | A1 | 1/2016 | Ma et al. |
| 2016/0057107 | A1 | 2/2016 | Call et al. |
| 2016/0092476 | A1 | 3/2016 | Stojanovic et al. |
| 2016/0092557 | A1* | 3/2016 | Stojanovic ............ G06Q 30/02 707/723 |
| 2016/0110657 | A1 | 4/2016 | Gibiansky et al. |
| 2016/0119377 | A1 | 4/2016 | Goldberg et al. |
| 2016/0132787 | A1* | 5/2016 | Drevo ................. G06N 20/10 706/12 |
| 2016/0162688 | A1 | 6/2016 | Call et al. |
| 2016/0197803 | A1 | 7/2016 | Talbot et al. |
| 2016/0308900 | A1 | 10/2016 | Sadika et al. |
| 2016/0371601 | A1 | 12/2016 | Grove et al. |
| 2017/0011105 | A1 | 1/2017 | Shet et al. |
| 2017/0068748 | A1* | 3/2017 | Hu ................... G06F 16/9024 |
| 2017/0083990 | A1 | 3/2017 | Hou et al. |
| 2017/0109424 | A1* | 4/2017 | Oberhofer ............. G06F 7/20 |
| 2017/0147930 | A1 | 5/2017 | Bellala et al. |
| 2017/0220336 | A1 | 8/2017 | Chen et al. |
| 2017/0228696 | A1* | 8/2017 | Brdiczka ........... G06Q 10/1053 |
| 2017/0228697 | A1* | 8/2017 | Brdiczka ........... G06Q 10/1053 |
| 2017/0236183 | A1 | 8/2017 | Klein et al. |
| 2017/0249432 | A1 | 8/2017 | Grantcharov |
| 2017/0316084 | A1 | 11/2017 | Pogrebtsov et al. |
| 2017/0331858 | A1 | 11/2017 | Clark, III et al. |
| 2017/0359361 | A1* | 12/2017 | Modani .............. G06F 16/285 |
| 2017/0359570 | A1 | 12/2017 | Holzer et al. |
| 2018/0018590 | A1 | 1/2018 | Szeto et al. |
| 2018/0107645 | A1 | 4/2018 | Payne et al. |
| 2018/0108149 | A1 | 4/2018 | Levinshtein |
| 2018/0113926 | A1* | 4/2018 | Llaves ............... G06N 5/04 |
| 2018/0115706 | A1 | 4/2018 | Kang et al. |
| 2018/0150548 | A1* | 5/2018 | Shah ................ G06F 16/254 |
| 2018/0165475 | A1 | 6/2018 | Veeramachaneni et al. |
| 2018/0165728 | A1 | 6/2018 | McDonald et al. |
| 2018/0173730 | A1 | 6/2018 | Copenhaver et al. |
| 2018/0173958 | A1 | 6/2018 | Hu et al. |
| 2018/0181641 | A1* | 6/2018 | Das .................. G06K 9/6215 |
| 2018/0181802 | A1 | 6/2018 | Chen et al. |
| 2018/0198602 | A1 | 7/2018 | Duffy et al. |
| 2018/0199066 | A1 | 7/2018 | Ross |
| 2018/0204111 | A1 | 7/2018 | Zadeh et al. |
| 2018/0240041 | A1 | 8/2018 | Koch et al. |
| 2018/0248827 | A1 | 8/2018 | Scharber et al. |
| 2018/0253894 | A1 | 9/2018 | Krishan et al. |
| 2018/0260474 | A1 | 9/2018 | Surdeanu et al. |
| 2018/0260704 | A1 | 9/2018 | Sun et al. |
| 2018/0268286 | A1 | 9/2018 | Dasgupta |
| 2018/0307978 | A1 | 10/2018 | Ar et al. |
| 2018/0336463 | A1 | 11/2018 | Bloom |
| 2018/0367484 | A1 | 12/2018 | Rodriguez et al. |
| 2019/0005657 | A1 | 1/2019 | Gao et al. |
| 2019/0026956 | A1 | 1/2019 | Gausebeck et al. |
| 2019/0034801 | A1* | 1/2019 | Sodhani ............... G06N 3/088 |
| 2019/0034833 | A1 | 1/2019 | Ding et al. |
| 2019/0042290 | A1 | 2/2019 | Bailey et al. |

(56) References Cited

U.S. PATENT DOCUMENTS

| | | | |
|---|---|---|---|
| 2019/0051051 | A1 | 2/2019 | Kaufman et al. |
| 2019/0057509 | A1 | 2/2019 | Lv et al. |
| 2019/0095472 | A1* | 3/2019 | Griffith ............... G06F 16/252 |
| 2019/0121883 | A1* | 4/2019 | Swaminathan ..... G06F 16/5862 |
| 2019/0147371 | A1 | 5/2019 | Deo et al. |
| 2019/0196600 | A1 | 6/2019 | Rothberg et al. |
| 2019/0220653 | A1 | 7/2019 | Wang et al. |
| 2019/0251184 | A1* | 8/2019 | Shan ...................... G06N 3/084 |
| 2019/0332705 | A1* | 10/2019 | Bordawekar ..... G06F 16/24537 |

OTHER PUBLICATIONS

Matthias Feurer, Jost Tobias Springenberg, Aaron Klein, Manuel Blum, Katharina Eggensperger, and Frank Hutter, "Supplementary Material for Efficient and Robust Automated Machine Learning", Advances in Neural Information Processing Systems 28 (Dec. 2015) https://papers.nips.cc/paper/5872-efficient-and-robust-automated-machine-learning-supplemental.zip accessed May 7, 2019, 13 pp.

Beaulieu-Jones et al., Privacy-preserving generative deep neural networks support 1 clinical data sharing, 7/52017, bioRxiv, total p. 40, http://dx.doi.org/10.1101/159756 (Year: 2017).

Berlin et al., "Database Schema Matching Using Machine Learning with Feature Selection," Electronic Publishing, Artistic Imaging, and Digital Typography, vol. 2348, pp. 452-466 (2002).

Brkic et al., I Know That Person: Generative Full Body and Face De-ldentification of People in Images, 2017 IEEE Conference on Computer Vision and Pattern Recognition Workshops, pp. 1319-1328 (Year: 2017).

C. Willems, T. Holz and F. Freiling, "Toward Automated Dynamic Malware Analysis Using CWSandbox," in IEEE Security & Privacy, vol. 5, No. 2, pp. 32-39, March-Apr. 2007. (Year: 2007).

Dernoncourt, F., Lee, J. Y., Uzuner, 0., & Szolovits, P. (2017). De-identification of patient notes with recurrent neural networks. Journal of the American Medical Informatics Association, 24(3), 596-606. (Year: 2017).

Domadia, S. G., & Zaveri, T. (May 2011). Comparative analysis of unsupervised and supervised image classification techniques. In Proceeding of National Conference on Recent Trends in Engineering & Technology (pp. 1-5). (Year: 2011).

Escovedo, Tatiana, et al. "DetectA: abrupt concept drift detection in non-stationary environments." Applied Soft Computing 62 (2017): 119-133. (Year: 2017).

Gidaris, S., & Komodakis, N. (2017). Detect, replace, refine: Deep structured prediction for pixel wise labeling. In Proceedings of the IEEE Conference on Computer Vision and Pattern Recognition (pp. 5248-5257). (Year: 2017).

Hasegawa et al. Interoperability for Mobile Agents by Incarnation Agents. AAMAS'Jul. 14-18, 03,2003, Melbourne, Australia. (Year: 2003).

Jiang, Z., Zhao, C., He, B., Guan, Y., & Jiang, J. (2017). De-identification of medical records using conditional random fields and long short-term memory networks. Journal of biomedical informatics, 75, S43-S53. (Year: 2017).

Kim, Yoon. "Convolutional neural networks for sentence classification." arXiv preprint arXiv: 1408. 5882 (2014). (Year: 2014).

Laszlo, M., & Mukherjee, S. (2013). Optimal univariate microaggregation with data suppression. Journal of Systems and Software, 86(3), 677-682. (Year: 2013).

Malekzadeh et al., Replacement Auto Encoder: A Privacy-Preserving Algorithm for Sensory Data Analysis, 2018 IEEE/ACM Third International Conference on Internet-of-Things Design and Implementation, pp. 166-176 (Year: 2018).

Marc Aurelio Ranzato, Arthur Szlam, Joan Bruna, Michael Mathieu, Ronan Collobert, and Sumit Chopra, "Video (Language) Modeling: A Baseline For Generative Models Of Natural Videos", Article, May 4, 2016, 15 pages, Courant Institute of Mathematical Sciences.

Park et al., Data Synthesis based on Generative Adversarial Networks, Aug. 2018, Proceedings of the VLDB Endowment, vol. 11, No. 10, pp. 1071-1083 (Year: 2018).

Qin Gao, Will Lewis, Chris Quirk, and Mei-Yuh Hwang. 2011. Incremental training and intentional over-fitting of word alignment. In Proceedings of MT Summit XIII. (Year: 2011).

Roberts, Mike. "Serverless Architectures". https://martinfowler.com/articles/serverless.html. May 22, 2018. Accessed Jul. 22, 2019. (Year: 2018).

Vondrick, Carl, Hamed Pirsiavash, and Antonio Torralba. "Generating videos with scene dynamics." Advances In Neural Information Processing Systems. 2016 (Year: 2016).

Wiktionary. "Spin Up". https://en.wiktionary.org/w/index.php?title=spin_up&oldid=49727714. Jun. 15, 2018. Accessed Jul. 19, 2019. (Year: 2018).

Xue, Tianfan, et al. "Visual dynamics: Probabilistic future frame synthesis via cross convolutional networks." Advances in Neural Information Processing Systems. 2016 (Year: 2016).

Extended European search report in European Application No. 19184839.9 dated Nov. 15, 2019 (9 pages).

Communication pursuant to Article 94(3) EPC for European Application No. 19184839.9 dated Jun. 4, 2021 (9 pages).

Feurer et al., "Efficient and Robust Automated Machine Learning," Department of Computer Science, University of Freiburg, Germany, pp. 1-9.

* cited by examiner

SYSTEMS AND METHODS FOR A DATA SEARCH ENGINE BASED ON DATA PROFILES

CROSS REFERENCE TO RELATED APPLICATIONS

This application claims the benefit of U.S. Provisional Application No. 62/694,968, filed Jul. 6, 2018, the content of which is expressly incorporated herein by reference in its entirety.

BACKGROUND

Conventional systems and methods of searching data typically involve searching data trees for a search term (e.g., a keyword, a sequence of characters, and/or a number). For example, a conventional search engine may search for user-generated search terms in an index of website data. Results may be based on the frequency of key words and/or clustering of key words.

Data analysis and data modeling efforts often need to identify data sources (e.g., to search for datasets). Problems arise, however, when applying conventional approaches to a search for datasets. Search-term based approaches may be inefficient, produce misleading or irrelevant results, and have limited scope (i.e., the search may be limited to a small number of drives, databases, or online resources). For example, search-term based methods may not account for the profile of a dataset (e.g., a data schema and/or statistical metric).

For example, an agent (e.g., a user, a system, a model, or other agent) may set an objective (i.e., a desired outcome). The objective may be to identify regional voting trends and find data related to that objective. As an illustrative example, the agent may possess a sample dataset that includes addresses, phone numbers, names, dates, and voting records. The sample dataset may have a data schema (i.e., a data structure or organization). However, a search-term based search (e.g., a search for a name) may yield large numbers of irrelevant datasets because it may return results unrelated to the desired objective (e.g., it may return phone records but not voting records). A search-term based search may be slow or miss relevant results because a search term is highly specific. Further, conventional systems may not allow the user to control how the search is performed (i.e., to set search parameters such as filtering results that contain a term, etc.). For example, some systems may determine which indexes to use on a search without an understanding of which index will perform better.

Therefore, in view of the shortcomings and problems with conventional approaches to searching for datasets, there is a need for unconventional approaches to data searches that are efficient, effective, customizable, and broad in scope. In particular, there is a need for unconventional systems to search data based on sample data.

SUMMARY

The disclosed embodiments provide unconventional methods and systems for searching datasets based on one or more data profiles. The disclosed systems and methods may be implemented using a combination of conventional hardware and software as well as specialized hardware and software, such as a machine constructed and/or programmed specifically for performing functions associated with the disclosed method steps.

Consistent with the present embodiments, a system for searching datasets is disclosed. The system may include one or more memory units storing instructions and one or more processors configured to execute the instructions to perform operations. The operations may include receiving a sample dataset and identifying a data schema of the sample dataset. The operations may include generating a sample data vector that includes statistical metrics of the sample dataset and information based on the data schema of the sample dataset. The operations may include searching a data index comprising a plurality of stored data vectors corresponding to a plurality of reference datasets. The stored data vectors may include statistical metrics of the reference datasets and information based on corresponding data schema of the reference datasets. The operations may include generating, based on the search and the sample data vector, one or more similarity metrics of the sample dataset to individual ones of the reference datasets.

Consistent with the present embodiments, a method for searching datasets is disclosed. The method may include receiving a sample dataset and identifying a data schema of the sample dataset. The method may include generating a sample data vector that includes statistical metrics of the sample dataset and information based on the data schema of the sample dataset. The method may include searching a data index comprising a plurality of stored data vectors corresponding to a plurality of reference datasets. The stored data vectors may include statistical metrics of the reference datasets and information based on corresponding data schema of the reference datasets. The method may include generating, based on the search and the sample data vector, one or more similarity metrics of the sample dataset to individual ones of the reference datasets.

Consistent with other disclosed embodiments, non-transitory computer readable storage media may store program instructions, which are executed by at least one processor device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

Figure 1:
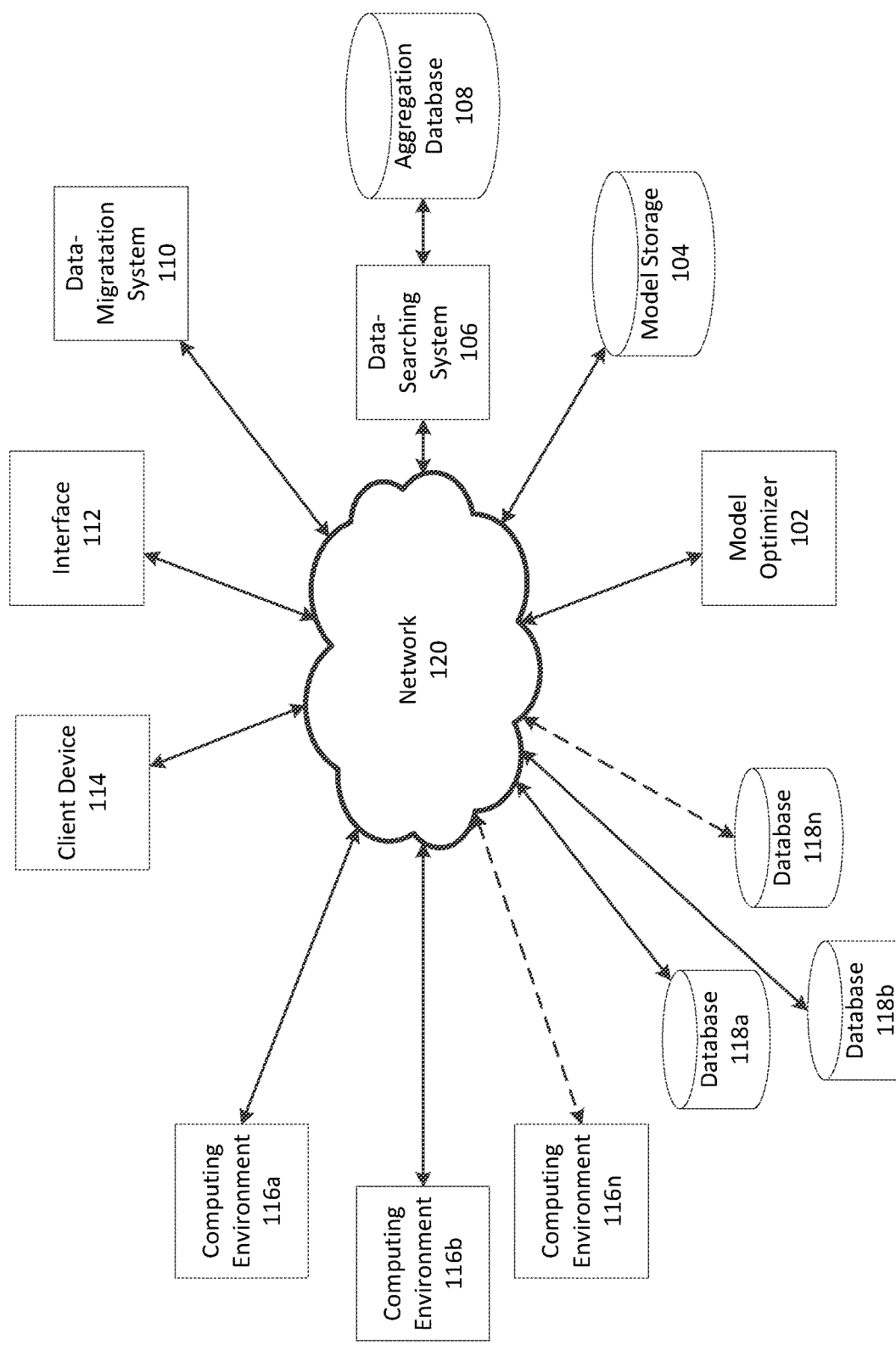
FIG. 1 depicts an exemplary system for searching data, consistent with disclosed embodiments.

Consistent with disclosed embodiments, systems and methods to search data sources based on a sample dataset are disclosed. For example, embodiments may include submitting a sample dataset (e.g., a CSV file or other dataset). Disclosed embodiments may include searching one or more databases, computing environments, and/or data indexes based on the sample datasets. Embodiments may include receiving one or more search results. Search results may include a dataset, a data vector, and/or a data source that comprises the dataset. The dataset may be the same as or similar to the sample dataset according to a similarity metric representing a measure of similarity between data in a dataset and data in the sample dataset.

The disclosed embodiments may involve profiling data and searching for data based on a data profile that may include a data schema and a statistical description of the data. Disclosed embodiments improve methods of searching remote data resources by generating data vectors based on data profiles and data indices. To achieve these improvements, disclosed embodiments may include one or more memory units for storing instructions and one or more processors configured to execute the instructions to perform operations. The embodiments provide unconventional systems and methods for generating data vectors based on data profiles, storing the data vectors in a data index, and searching the data index.

Systems and methods of disclosed embodiments may involve datasets comprising actual data reflecting real-world conditions, events, and/or measurement. However, in some embodiments, disclosed systems and methods may fully or partially involve synthetic data (e.g., anonymized actual data or fake data). Datasets may involve numeric data, text data, and/or image data. For example, datasets may include transaction data, financial data, demographic data, public data, government data, environmental data, traffic data, network data, transcripts of video data, genomic data, proteomic data, and/or other data. Datasets of the embodiments may be in a variety of data formats including, but not limited to, PARQUET, AVRO, SQLITE, POSTGRESQL, MYSQL, ORACLE, HADOOP, CSV, JSON, and/or other data formats.

Datasets of disclosed embodiments may have a respective data schema (i.e., structure), including a data type, key-value pair, label, metadata, field, relationship, view, index, package, procedure, function, trigger, sequence, synonym, link, directory, queue, or the like. Datasets of the embodiments may contain foreign keys, i.e., data elements that appear in multiple datasets and may be used to cross-reference data and determine relationships between datasets. Foreign keys may be unique (e.g., a personal identifier) or shared (e.g., a postal code). Datasets of the embodiments may be "clustered," i.e., a group of datasets may share common features, such as overlapping data, shared statistical properties, etc. Clustered datasets may share hierarchical relationships (i.e., data lineage).

Reference will now be made in detail to exemplary embodiments, examples of which are illustrated in the accompanying drawings and disclosed herein. Wherever convenient, the same reference numbers will be used throughout the drawings to refer to the same or like parts. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

FIG. 1 is a diagram of an exemplary system 100 for searching for data, consistent with disclosed embodiments. As shown, system 100 may include a model optimizer 102, a model storage 104, a data-searching system 106, an aggregation database 108, a data-migration system 110, an interface 112, a client device 114, one or more computing environments 116a, 116b, 116n, and one or more databases 118a, 118b, 118n. Components of system 100 may be connected to each other through a network 120.

In some embodiments, aspects of system 100 may be implemented on one or more cloud services designed to generate ("spin-up") one or more ephemeral container instances in response to event triggers, assign one or more tasks to a container instance, and terminate ("spin-down") a container instance upon completion of a task. By implementing methods using cloud services, disclosed systems may efficiently provision resources based on demand and provide security advantages because the ephemeral container instances may be closed and destroyed upon completion of a task. That is, the container instances do not permit access from outside using terminals or remote shell tools like SSH, RTP, FTP, or CURL, for example. Further, terminating container instances may include destroying data, thereby protecting sensitive data. Destroying data can provide security advantages because it may involve permanently deleting data (e.g., overwriting data) and associated file pointers.

As will be appreciated by one skilled in the art, the components of system 100 can be arranged in various ways and implemented with any suitable combination of hardware, firmware, and/or software, as applicable. For example, as compared to the depiction in FIG. 1, system 100 may include a larger or smaller number of model optimizers, model storages, data-searching systems, aggregation databases, data-migration systems, interfaces, client devices, computing environments, and/or databases. In addition, system 100 may further include other components or devices not depicted that perform or assist in the performance of one or more processes, consistent with the disclosed embodiments. The exemplary components and arrangements shown in FIG. 1 are not intended to limit the disclosed embodiments.

Model optimizer 102 may include one or more computing systems configured to manage training of models for system 100, consistent with disclosed embodiments. Model optimizer 102 may be configured to receive models and/or datasets from other components of system 100 or other components not shown (e.g., via interface 112). Model optimizer 102 may be configured to train models. Model optimizer 102 may be configured to generate models and/or corresponding generalized representations. In some embodiments, model optimizer 102 may be configured to export models to other components of system 100 and/or to external systems or devices.

Model optimizer 102 may be configured to generate models based on instructions received from a user or another system (e.g., via interface 112). For example, model optimizer 102 may be configured to receive a visual (graphical) depiction of a machine learning model and parse that graphical depiction into instructions for creating and training a corresponding neural network. Model optimizer 102 may be configured to select model training hyperparameters. This selection may be based on model performance feedback produced by model optimizer 102 during model training and/or received from another component of system 100. Model optimizer 102 may be configured to provide trained models and descriptive information concerning the trained models to model storage 104.

Model optimizer 102 may be configured to train machine learning models by optimizing model parameters and/or hyperparameters (hyperparameter tuning) using an optimization technique, consistent with disclosed embodiments.

The optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. Tuning a hyperparameter may include iteratively selecting a hyperparameter and training model parameters using the hyperparameter until a training criterion is satisfied, consistent with disclosed embodiments.

Model storage 104 may be configured to store models, including machine learning models, consistent with disclosed embodiments. In some embodiments, some or all components of model storage 104 may be hosted on one or more servers, one or more clusters of servers, or one or more cloud services. Model storage 104 may be connected to network 120 and may additionally or alternatively be directly connected to model optimizer 102 (not shown). In some embodiments, model storage 104 may be a component of model optimizer 102, data-searching system 106, or client device 114 (not shown).

Model storage 104 may include one or more databases configured to store data models (e.g., machine learning models or statistical models) and descriptive information of the data models. Model storage 104 may be configured to provide information regarding available data models to a user or another system. The databases may include cloud-based databases, cloud-based buckets, or on-premises databases. The information may include model information, such as the type and/or purpose of the model and any measures of classification error. Model storage 104 may include one or more databases configured to store indexed and clustered models for use by system 100. For example, model storage 104 may store models associated with generalized representations of those models (e.g., neural network architectures stored in TENSORFLOW or other standardized formats). The databases may include cloud-based databases (e.g., AMAZON WEB SERVICES S3 buckets) or on-premises databases.

Data-searching system 106 may include a computing device, a computer, a server, a server cluster, a plurality of clusters, and/or a cloud service, consistent with disclosed embodiments. Data-searching system 106 may include one or more memory units and one or more processors configured to perform operations consistent with disclosed embodiments. Data-searching system 106 may include computing systems configured to manage training of models for system 100, profile datasets, index datasets, and perform other methods consistent with disclosed embodiments. Data-searching system 106 may be configured to receive and/or retrieve models, and/or datasets from other components of system 100 or from computing components outside system 100 (e.g., via interface 112). In some embodiments not shown, data-searching system 106 may be a component of data-migration system 110. Data-searching system 106 is disclosed in greater detail below (in reference to FIG. 2).

Aggregation database 108 may include one or more databases configured to store data for use by system 100, consistent with disclosed embodiments. The databases may include cloud-based databases (e.g., AMAZON WEB SERVICES S3 buckets) or on-premises databases. In some embodiments, aggregation database 108 may store one or more datasets, data vectors, and data indexes. For example, aggregation database 108 may be configured to store one or more data vectors comprising statistical metrics of a dataset and information based on a corresponding data schema of the dataset. Aggregation database 108 may include data received from other components of system 100, including, for example, data-migration system 110 and/or data-searching system 106.

Data-migration system 110 may include a computing device, a computer, a server, a server cluster, a plurality of clusters, and/or a cloud service, consistent with disclosed embodiments. Data-migration system 110 may include one or more memory units and one or more processors configured to perform operations consistent with disclosed embodiments. Data-migration system 110 may include computing systems configured to manage movement (i.e., transfer) of data between components of system 100, to manage movement of data between components of system 100 and computing components outside system 100, and to perform other methods consistent with disclosed embodiments. Data-migration system 110 may be configured to receive and/or retrieve models, and/or datasets from other components of system 100 or from computing components outside system 100 (e.g., via interface 112). In some embodiments not shown, data-migration system 110 may be a component of data-searching system 106. Data-migration system 110 is disclosed in greater detail below (in reference to FIG. 3).

Interface 112 may be configured to manage interactions between system 100 and other systems using network 120, consistent with disclosed embodiments. In some aspects, interface 112 may be configured to publish data received from other components of system 100. This data may be published in a publication and subscription framework (e.g., using APACHE KAFKA), through a network socket, in response to queries from other systems, or using other known methods. The data may be synthetic data, as described herein. As an additional example, interface 112 may be configured to provide information received from model storage 104 regarding available datasets. In various aspects, interface 112 may be configured to provide data or instructions received from other systems to components of system 100. For example, interface 112 may be configured to receive instructions for generating data models (e.g., type of data model, data model parameters, training data indicators, training hyperparameters, or the like) from another system and provide this information to model optimizer 102. As an additional example, interface 112 may be configured to receive data including sensitive portions from another system (e.g., in a file, a message in a publication and subscription framework, a network socket, or the like) and provide that components of system 100.

Client device 114 may include one or more memory units and one or more processors configured to perform operations consistent with disclosed embodiments. In some embodiments, client device 114 may include hardware, software, and/or firmware modules. Client device 114 may be a terminal, a kiosk, a mobile device, a tablet, a personal computer, a server, a server cluster, a cloud service, a storage device, a specialized device configured to perform methods according to disclosed embodiments, or the like.

Computing environments 116a, 116b, 116n may include one or more memory units and one or more processors configured to perform operations consistent with disclosed embodiments. In some embodiments, computing environments 116a, 116b, 116n may be or include a virtual private cloud, a local computing environment (e.g., a personal computer, terminal, kiosk, or workstation), a server, a server cluster, a device (e.g., a mobile device, a tablet, a laptop, etc.), and/or another computing environment. In some embodiments, at least one computing environment may connect to system 100 via interface 112 (not shown in FIG. 1). One or more computing environments 116a, 116b, 116n may be unconnected to other computing environments except via network 120 (i.e., they may be disparate computing environments). In some embodiments, one or more computing environments may be directly connected to each other (not shown in FIG. 1). As noted above, computing environments 116a, 116b, 116n are exemplary only and system 100 may include additional or fewer computing environments. Computing environments 116a, 116b, 116n are disclosed in greater detail below (in reference to FIG. 4).

Databases 118a, 118b, 118n may include one or more databases configured to store data for use by system 100, consistent with disclosed embodiments. The databases may include cloud-based databases (e.g., AMAZON WEB SERVICES S3 buckets) or on-premises databases. In some embodiments, one or more databases 118a, 118b, 118n may store one or more datasets, data vectors, and data indexes. For example, at least one of databases 118a, 118b, 118n may be configured to store one or more data vectors comprising statistical metrics of a dataset and information based on a corresponding data schema of the dataset. As noted above, databases 118a, 118b, 118n are exemplary only and system 100 may include additional or fewer databases.

As shown in FIG. 1, at least one of model optimizer 102, model storage 104, data-searching system 106, aggregation database 108, data-migration system 110, interface 112, client device 114, computing environments 116a, 116b, 116n, and/or databases 118a, 118b, 118n may connect to network 120. Network 120 may be a public network or private network and may include, for example, a wired or wireless network, including, without limitation, a Local Area Network, a Wide Area Network, a Metropolitan Area Network, an IEEE 1002.11 wireless network (e.g., "Wi-Fi"), a network of networks (e.g., the Internet), a land-line telephone network, or the like. Network 120 may be connected to other networks (not depicted in FIG. 1) to connect the various system components to each other and/or to external systems or devices. In some embodiments, network 120 may be a secure network and require a password to access the network.

Figure 2:
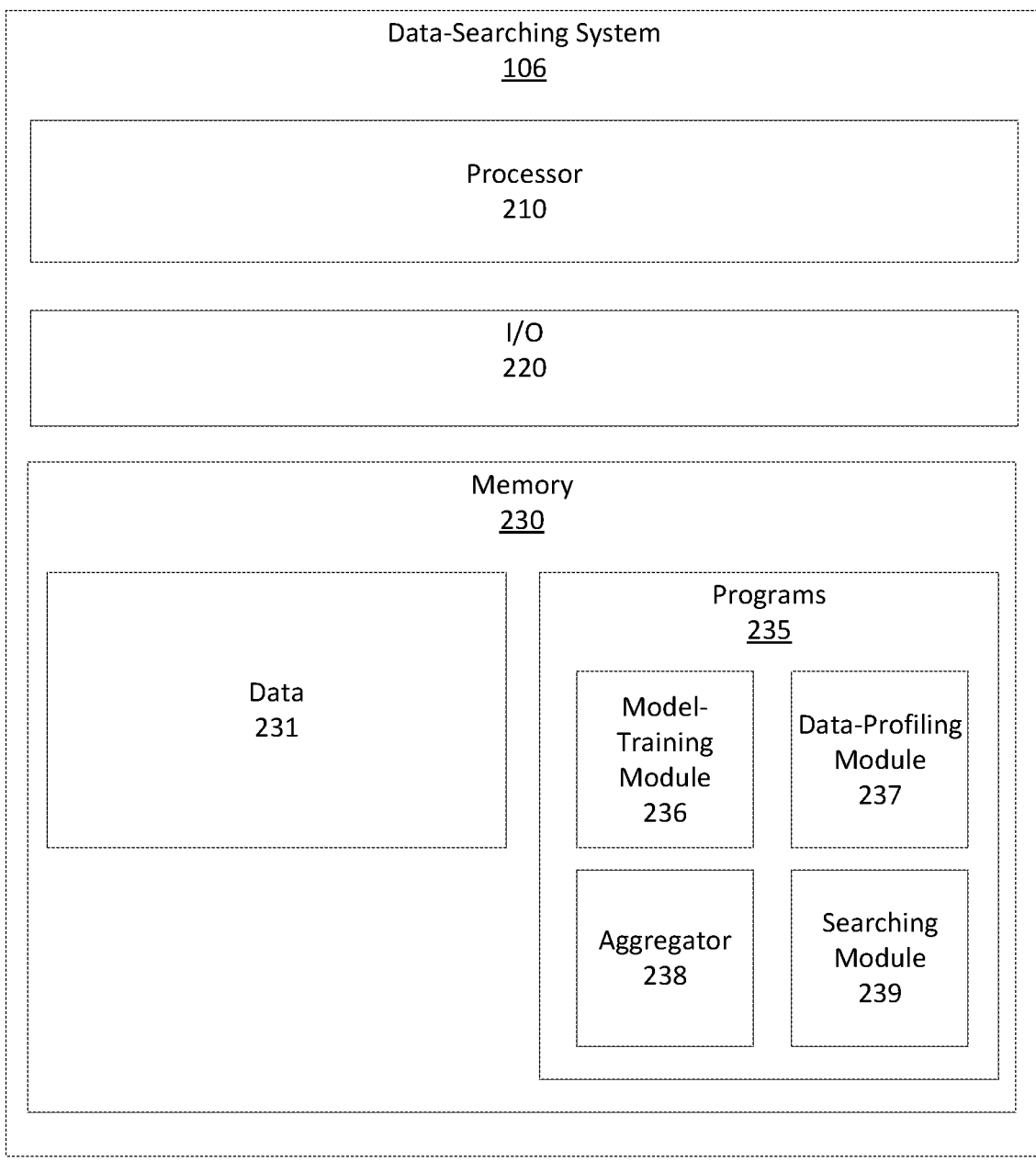
FIG. 2 depicts an exemplary data-searching system, consistent with disclosed embodiments.

FIG. 2 depicts exemplary data-searching system 106, consistent with disclosed embodiments. Data-searching system 106 may include a computing device, a computer, a server, a server cluster, a plurality of clusters, and/or a cloud service, consistent with disclosed embodiments. As shown, data-searching system 106 may include one or more processors 210, one or more I/O devices 220, and one or more memory units 230. In some embodiments, some or all components of data-searching system 106 may be hosted on a device, a computer, a server, a cluster of servers, or a cloud service. In some embodiments, data-searching system 106 may be a scalable system configured to efficiently manage resources and enhance security by provisioning computing resources in response to triggering events and terminating resources after completing a task (e.g., a scalable cloud service that spins up and terminates container instances).

FIG. 2 depicts an exemplary configuration of data-searching system 106. As will be appreciated by one skilled in the art, the components and arrangement of components included in data-searching system 106 may vary. For example, as compared to the depiction in FIG. 2, data-searching system 106 may include a larger or smaller number of processors, I/O devices, or memory units. In addition, data-searching system 106 may further include other components or devices not depicted that perform or assist in the performance of one or more processes consistent with the disclosed embodiments. The components and arrangements shown in FIG. 2 are not intended to limit the disclosed embodiments, as the components used to implement the disclosed processes and features may vary.

Processor 210 may comprise known computing processors, including a microprocessor. Processor 210 may constitute a single-core or multiple-core processor that executes parallel processes simultaneously. For example, processor 210 may be a single-core processor configured with virtual processing technologies. In some embodiments, processor 210 may use logical processors to simultaneously execute and control multiple processes. Processor 210 may implement virtual machine technologies, or other known technologies to provide the ability to execute, control, run, manipulate, store, etc., multiple software processes, applications, programs, etc. In another embodiment, processor 210 may include a multiple-core processor arrangement (e.g., dual core, quad core, etc.) configured to provide parallel processing functionalities to allow execution of multiple processes simultaneously. One of ordinary skill in the art would understand that other types of processor arrangements could be implemented that provide for the capabilities disclosed herein. The disclosed embodiments are not limited to any type of processor(s) 210. Processor 210 may execute various instructions stored in memory 230 to perform various functions of the disclosed embodiments described in greater detail below. Processor 210 is configured to execute functions written in one or more known programming languages.

I/O devices 220 may include at least one of a display, an LED, a router, a touchscreen, a keyboard, a microphone, a speaker, a haptic device, a camera, a button, a dial, a switch, a knob, a transceiver, an input device, an output device, or another I/O device to perform methods of the disclosed embodiments. I/O devices 220 may be components of an interface of data-searching system 106 (e.g., an interface such as interface 112).

Memory 230 may be a volatile or non-volatile, magnetic, semiconductor, optical, removable, non-removable, or other type of storage device or tangible (i.e., non-transitory) computer-readable medium, consistent with disclosed embodiments. As shown, memory 230 may include data 231, including of at least one of encrypted data or unencrypted data. Data 231 may include one or more model indexes, model parameters, model hyperparameters, model codes, dataset indexes, data vectors, and/or datasets, consistent with disclosed embodiments.

Programs 235 may include one or more programs (e.g., modules, code, scripts, or functions) used to perform methods consistent with disclosed embodiments. Programs may include operating systems (not shown) that perform known operating system functions when executed by one or more processors. Disclosed embodiments may operate and function with computer systems running any type of operating system. Programs 235 may be written in one or more programming or scripting languages. One or more of such software sections or modules of memory 230 may be integrated into a computer system, non-transitory computer-readable media, or existing communications software. Programs 235 may also be implemented or replicated as firmware or circuit logic.

Programs 235 may include a model-training module 236, data-profiling module 237, aggregator 238, searching module 239 and/or other modules not depicted to perform methods of the disclosed embodiments. In some embodiments, modules of programs 235 may be configured to generate ("spin up") one or more ephemeral container instances to perform a task and/or to assign a task to a running (warm) container instance, consistent with disclosed embodiments. Modules of programs 235 may be configured to receive, retrieve, and/or generate models, consistent with disclosed embodiments. Modules of programs 235 may be configured to receive, retrieve, and/or generate datasets (e.g., to generate synthetic datasets, data samples, or other datasets), consistent with disclosed embodiments. Modules of programs 235 may be configured to perform operations in coordination with one another.

Model-training module 236 may be configured to train one or more models and/or perform hyperparameter tuning of one or more models, including machine learning models. For example, model-training module 236 may be configured to receive input of one or more thresholds, one or more loss functions, and/or one or more limits on a number of interactions and apply the input for optimizing a received model and/or corresponding generalized representation such as a neural network. In some embodiments, training of a model terminates when a training criterion is satisfied. In some embodiments, model-training module 236 is configured to adjust model parameters during training. The model parameters may include weights, coefficients, offsets, or the like. Training may be supervised or unsupervised.

Model-training module 236 may be configured to select or generate model parameters (e.g., number of layers for a neural network, kernel function for a kernel density estimator, or the like), update training hyperparameters, and evaluate model characteristics. For example, model characteristics may include a model type (e.g., an RNN, a convolutional neural network (CNN), a random forest, or another model type), a model parameter, a model hyperparameter (including training a hyperparameter and/or an architectural hyperparameter), a desired outcome, belongingness to a model cluster, and/or belonginess of a model training dataset to a dataset cluster, the similarity of synthetic data generated by a model to actual data, or other characteristics.

In some embodiments, model-training module 236 may be configured to perform a search of a hyperparameter space and select new hyperparameters. This search may or may not depend on the values of a performance metric obtained for other trained models. In some aspects, model-training module 236 may be configured to perform a grid search or a random search. The hyperparameters may include training hyperparameters, which may affect how training of the model occurs, or architectural hyperparameters, which may affect the structure of the model.

Consistent with disclosed embodiments, hyperparameters may include training hyperparameters such as learning rate, batch size, number of training batches, number of epochs, chunk size, time window, input noise dimension, or the like. Hyperparameters may include architectural parameters such as number of layers in a neural network, the choice of activation function for a neural network node, the layers in a CNN or the like. For example, when the stored model comprises a generative adversarial network (GAN), training hyperparameters for the model may include a weight for a loss function penalty term that penalizes the generation of training data according to a similarity metric. As a further example, when the stored model comprises a neural network, the training hyperparameters may include a learning rate for the neural network. As an additional example, when the model is a CNN, architectural hyperparameters may include the number and type of layers in the convolutional neural network.

In some embodiments, model-training module 236 may include programs to apply one or more templates to a data model (e.g., a model retrieved from model storage 104) and apply the templates to generate a generalized representation of the retrieved model (e.g., a neural network). Model-training module 236 may include programs to provide trained generalized representations to model storage 104 for storing in association with corresponding models.

Data-profiling module 237 may be configured to profile a dataset, consistent with disclosed embodiments. A data profile may include information related to a data schema (i.e., the organization or structure of a dataset), including a data type, key-value pair, a label, metadata, a field, a relationship, a view, an index, a package, a procedure, a function, a trigger, a sequence, a synonym, a link, a directory, a queue, or the like. A data profile may include a statistical profile of a dataset that includes a plurality of descriptive (statistical) metrics of the dataset. For example, the statistical metrics may include an average, a mean, a standard deviation, a range, a moment, a variance, a covariance, a covariance matrix or any other statistical metric of the selected dataset.

In some embodiments a statistical metric may be a similarity metric representing a measure of similarity between data in a dataset. The similarity metric may be based on a covariance matrix, a variance, a frequency of overlapping values, or other measure of statistical similarity. In some embodiments, data-profiling module 237 implements a machine learning model (e.g., a data-profiling model) to generate the similarity metric Data-profiling module 237 may include, may be configured generate, and/or may be configured to implement one or more data-profiling models. A data-profiling model may include machine-learning models and statistical models to determine the data schema and/or a statistical profile of a dataset (i.e., to profile a dataset), consistent with disclosed embodiments. The data-profiling model may include an RNN model, a CNN model, a variational autoencoder (VAE) model, an autoencoder model, or another machine-learning model. The data-profiling model may include algorithms to determine a data type, key-value pairs, row-column data structure, statistical distributions of information such as keys or values, or other property of a data schema. The data-profiling model may be configured to implement univariate and multivariate statistical methods. The data-profiling model may include a regression model, a Bayesian model, a statistical model, a linear discriminant analysis model, or other classification model configured to determine one or more descriptive metrics of a dataset. For example, the data-profiling model may include algorithms to determine an average, a mean, a standard deviation, a quantile, a quartile, a probability distribution function, a range, a moment, a variance, a covariance, a covariance matrix, a dimension and/or dimensional relationship (e.g., as produced by dimensional analysis such as length, time, mass, etc.) or any other descriptive metric of a dataset.

In some embodiments, the data-profiling model may be trained to identify complex data types, i.e. a datatype whose structure may be based on an underlying rule (e.g., a social security number, a longitude, a zip code, an account number, an international telephone number, an address, a license plate number, a driver's license number, a government identification number, a passport number, or the like). In some embodiments, the data-profiling model may be trained to identify a complex variable as an address and may be trained to further identify complex variables as including United States addresses and/or Japanese addresses. The data-profiling model may be configured to tag identified variables. In some embodiments, the data-profiling model may be configured to perform embedding (e.g., feature embedding).

Data-profiling module 237 may be configured to generate a data vector based on a data profile, consistent with disclosed embodiments. A data vector may include one or more statistical metrics of a corresponding reference datasets or of a variable (e.g., a data column) of the reference dataset. A data vector may include information based on a corresponding data schema of the reference dataset. For example, the data vector may include data relating to a data schema including a data type, key-value pair, a label, metadata, a field, a relationship, a view, an index, a package, a procedure, a function, a trigger, a sequence, a synonym, a link, a directory, a queue, or the like. In some embodiments, data-profile module 237 may be configured to generate a plurality of data vectors based on corresponding data profiles. Data-profiling module 237 may be configured to generate metadata associated with a data vector. For example, data-profiling module 237 may generate a tag, a label, a unique identifier, a title, a data class name (e.g., "health data", "financial data", "environmental data", etc.), a data format, or other metadata. Data-profiling module 237 may be configured to perform calculations on the dataset (e.g., converting measurement units, normalizing data values, classifying data values into a category, or other calculations).

Data-profiling module 237 may be configured to aggregate and/or store the plurality of data vectors in a data storage, consistent with disclosed embodiments. For example, the plurality of data vectors may be stored as a data index, a matrix, in a relational database, or in another format. In some embodiments, the data vector may include statistical metrics of a plurality of data vectors based on a plurality of corresponding data profiles, consistent with disclosed embodiments. In some embodiments, the data vector may be a subset of a data profile. In some embodiments, the data vector may be the data profile. In some embodiments, the data vector may include a statistical metric of the data profile (e.g., a mean of a plurality of means).

Aggregator 238 may include programs (scripts, functions, algorithms) to aggregate datasets and/or data indexes, consistent with disclosed embodiments. In some embodiments, aggregator 238 may be configured to retrieve and/or receive data (e.g., a dataset, a data vector, a data index, a model, and/or a model index), transmit data, and/or store data in a data storage. In some embodiments, aggregator 238 may be configured to transmit data to, store data in, receive data from, and/or retrieve data from other components of system 100 (e.g., data 231; computing environments 116a, 116b, 116n; databases 118a, 118b, 118n; aggregation database 108; model storage 104; data-migration system 110; or other components). In some embodiments, aggregator 238 may be configured to transmit data to, store data in, receive data from, and/or retrieve data from a computing component outside system 100 (e.g., via interface 112). In some embodiments, aggregator 238 may receive data from or transmit data to other modules of data-searching system 106. In some embodiments, aggregator 238 may be configured to transmit, store, receive, and/or retrieve data according to at least one of a predetermined schedule or a triggering event. A triggering event may include receiving a notification, receiving a dataset, receiving a request, and/or another event.

Searching module 239 may include programs (scripts, functions, algorithms, routines, or the like) to conduct a search, consistent with disclosed embodiments. In some embodiments, searching module 239 may include programs to generate and maintain searchable data indexes as data trees based on the data vectors (e.g., a B-Tree). In some embodiments, searching module 239 may include programs based on POSTGRESQL or other object-relational database management system. For example, searching module 239 may be configured to generate a data index (e.g., a RUM-index and/or GIN-index and/or Locality-Sensitive Hashing). The data index may be configured to be searched (e.g., as a data tree). The data index may be based on the data vectors and/or data profiles and organized for efficient searching with or without using k-nearest neighbors clustering-based methods.

Searching module 239 may be configured to execute a search of the data index. In some embodiments, searching module 239 may be configured to receive search parameters such as the types of data to search or other information related to data types and schemas to guide the search of the data index. For example, the search parameters may indicate that the search will weigh the data schema of a dataset more than the particular data values or statistical metrics of the dataset. Search parameters may be received from another component of system 100 or a computing component outside system 100 (e.g., via interface 112). In some embodiments, the search parameters may include instructions to search a data index by first comparing data schemas then by comparing statistical metrics. The search parameters may include instructions to search the data profile (i.e., schema and statistical metrics) of a dataset then to search variables (e.g., data columns) of a dataset. In some embodiments, searching module 239 may be configured to generate search parameters using a machine learning model trained to use learned features of data to improve search accuracy.

Figure 3:
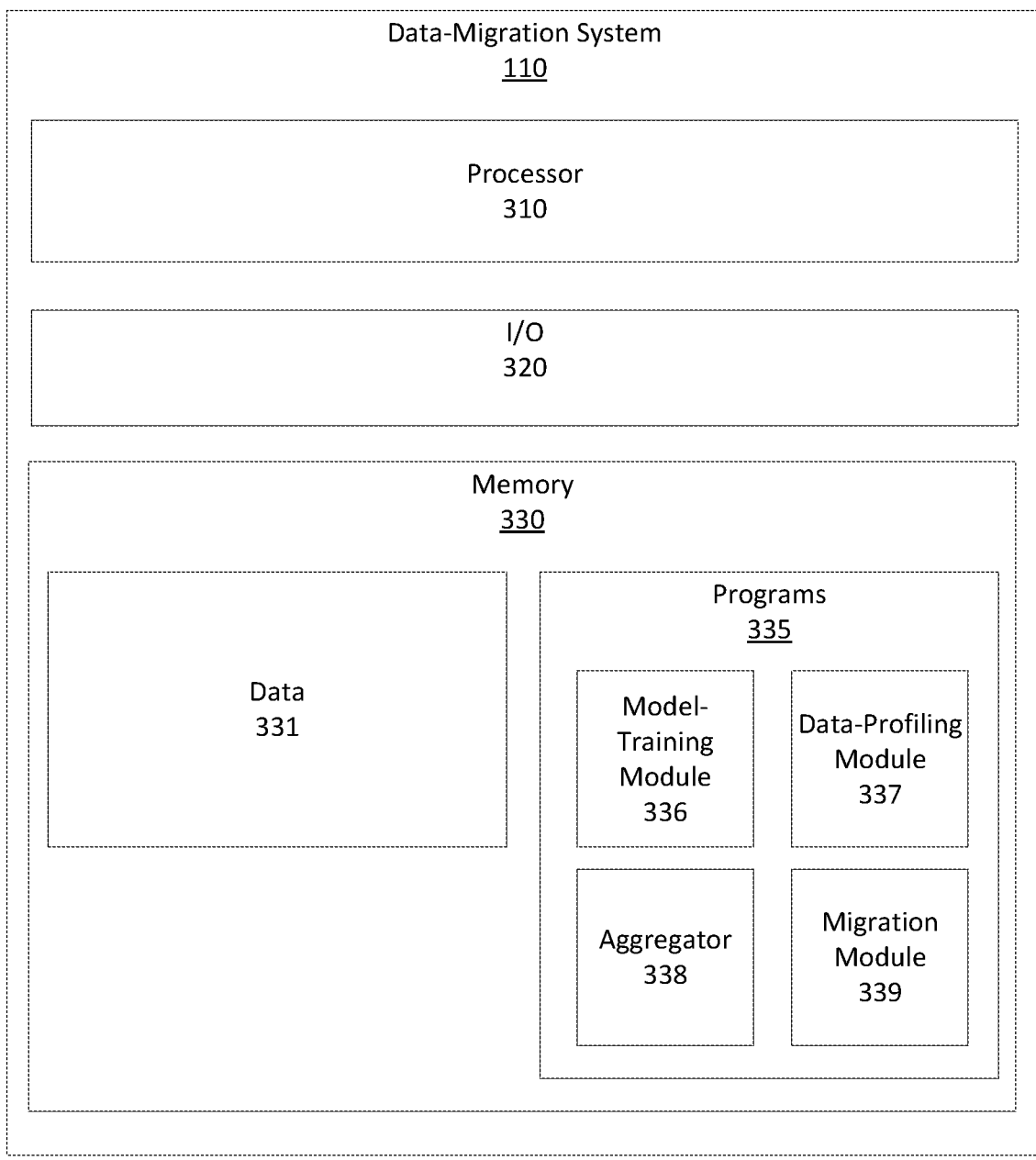
FIG. 3 depicts an exemplary data-migration system, consistent with disclosed embodiments.

FIG. 3 depicts an exemplary data-migration system 110, consistent with disclosed embodiments. Data-migration system 110 may include computing systems configured to manage movement of data between components of system 100 and/or to manage movement of data between components of system 100 and computing components outside system 100. Data-migration system 110 may include a computing device, a computer, a server, a server cluster, a plurality of clusters, and/or a cloud service, consistent with disclosed embodiments. As shown, data-migration system 110 includes one or more processors 310, one or more I/O devices 320, and one or more memory units 330. In some embodiments, some or all components of data-migration system 110 may be hosted on a device, a computer, a server, a cluster of servers, or a cloud service. In some embodiments, data-migration system 110 is a scalable system configured to efficiently manage resources and enhance security by provisioning computing resources in response to triggering events and terminating resources after completing a task (e.g., a scalable cloud service that spins up and terminates container instances).

FIG. 3 depicts an exemplary configuration of data-migration system 110. As will be appreciated by one skilled in the art, the components and arrangement of components included in data-migration system 110 may vary. For example, as compared to the depiction in FIG. 3, data-migration system 110 may include a larger or smaller number of processors 310, I/O devices 320, or memory units 330. In addition, data-migration system 110 may further include other components or devices not depicted that perform or assist in the performance of one or more processes consistent with the disclosed embodiments. The components and arrangements shown in FIG. 3 are not intended to limit the disclosed embodiments, as the components used to implement the disclosed processes and features may vary.

Processor 310 may comprise known computing processors, including a microprocessor. Processor 310 may constitute a single-core or multiple-core processor that executes parallel processes simultaneously. For example, processor 310 may be a single-core processor configured with virtual processing technologies. In some embodiments, processor 310 may use logical processors to simultaneously execute and control multiple processes. Processor 310 may implement virtual machine technologies, or other known technologies to provide the ability to execute, control, run, manipulate, store, etc., multiple software processes, applications, programs, etc. In another embodiment, processor 310 may include a multiple-core processor arrangement (e.g., dual core, quad core, etc.) configured to provide parallel processing functionalities to allow execution of multiple processes simultaneously. One of ordinary skill in the art would understand that other types of processor arrangements could be implemented that provide for the capabilities disclosed herein. The disclosed embodiments are not limited to any type of processor(s) 310. Processor 310 may execute various instructions stored in memory 330 to perform various functions of the disclosed embodiments described in greater detail below. Processor 310 is configured to execute functions written in one or more known programming languages.

I/O devices 320 may include at least one of a display, an LED, a router, a touchscreen, a keyboard, a microphone, a speaker, a haptic device, a camera, a button, a dial, a switch, a knob, a transceiver, an input device, an output device, or another I/O device to perform methods of the disclosed embodiments. I/O devices 320 may be components of an interface of data-migration system 110.

Memory 330 may be a volatile or non-volatile, magnetic, semiconductor, optical, removable, non-removable, or other type of storage device or tangible (i.e., non-transitory) computer-readable medium, consistent with disclosed embodiments. As shown, memory 330 may include data 331, including of at least one of encrypted data or unencrypted data. Data 331 may include one or more model indexes, model parameters, model hyperparameters, model codes, data indexes, data vectors, and/or datasets, consistent with disclosed embodiments.

Programs 335 may include one or more programs (e.g., modules, code, scripts, or functions) used to perform methods consistent with disclosed embodiments. Programs may include operating systems (not shown) that perform known operating system functions when executed by one or more processors. Disclosed embodiments may operate and function with computer systems running any type of operating system. Programs 335 may be written in one or more programming or scripting languages. One or more of such software sections or modules of memory 330 may be integrated into a computer system, non-transitory computer-readable media, or existing communications software. Programs 335 may also be implemented or replicated as firmware or circuit logic.

In some embodiments, modules of programs 335 may be configured to generate ("spin up") one or more ephemeral container instances to perform a task and/or to assign a task to a running (warm) container instance, consistent with disclosed embodiments. Modules of programs 335 may be configured to receive, retrieve, and/or generate models, consistent with disclosed embodiments. Modules of programs 335 may be configured to receive, retrieve, and/or generate datasets (e.g., to generate synthetic datasets, data samples, or other datasets), consistent with disclosed embodiments. Modules of programs 335 may be configured to perform operations in coordination with one another.

As shown, programs 335 may include a model-training module 336, data-profiling module 337, aggregator 338, migration module 339 and/or other modules not depicted to perform methods of the disclosed embodiments. Model-training module 336 may include, may be configured generate, and/or may be configured to implement any of the models, algorithms, functions, programs, scripts and/or other computing code as disclosed in reference to model-training module 236, above. Data-profiling module 337 may include, may be configured generate, and/or may be configured to implement any of the models, algorithms, functions, programs, scripts and/or other computing code as disclosed in reference to data-profiling module 237, above. Aggregator 338 may include, may be configured generate, and/or may be configured to implement any of the models, algorithms, functions, programs, scripts and/or other computing code as disclosed in reference to model-training module 236, above.

Migration module 339 may be configured to receive and/or retrieve data from one computing component and transmit the data to another component. The computing components may be part of system 100 or outside system 100. Migration module 339 may be configured to generate and maintain logs or other records related to data transfers. In some embodiments, migration module 339 may be configured to generate and/or maintain logs or other records of data transfers that other components of system 100 perform. For example, migration module 339 may receive a notification that includes a statement of a data transfer to or from a component of system 100 and generate or update a log based on the notification. Migration module 339 may aggregate logs or other records of data transfer that are generated by other components of system 100. For example, migration module 339 may receive a log from a component of system 100 and update an aggregated log file. Updating a log file or aggregated log file may include identifying and removing duplicate records.

Data-migration system 110 may manage some or all dataset transfers to and from components of system 100. For example, in some embodiments, some or all datasets that enter system 100 may be received at data-migration system 110 prior to being transferred to another component of system 100. In some embodiments, some or all datasets that exits system 100 may be received at data-migration system 110 prior to being transferred to a computing component outside system 100. In some embodiments, some or all datasets transferred from a component of system 100 may be received at data-migration system 110 before being transferred to another component of system 100. In some embodiments, data-migration system 110 may maintain a log or record of some or all dataset transfers between components of system 100. In some embodiments, data-migration system 110 may maintain a log or record of some or all dataset transfers between components of system 100 and computing components outside system 100.

In some embodiments, data-migration system 110 may be configured to receive a request to transfer data. Data-migration system 110 may be configured to transfer data based on the request. The request may include a statement indicating a data source and/or a desired data destination.

Figure 4:
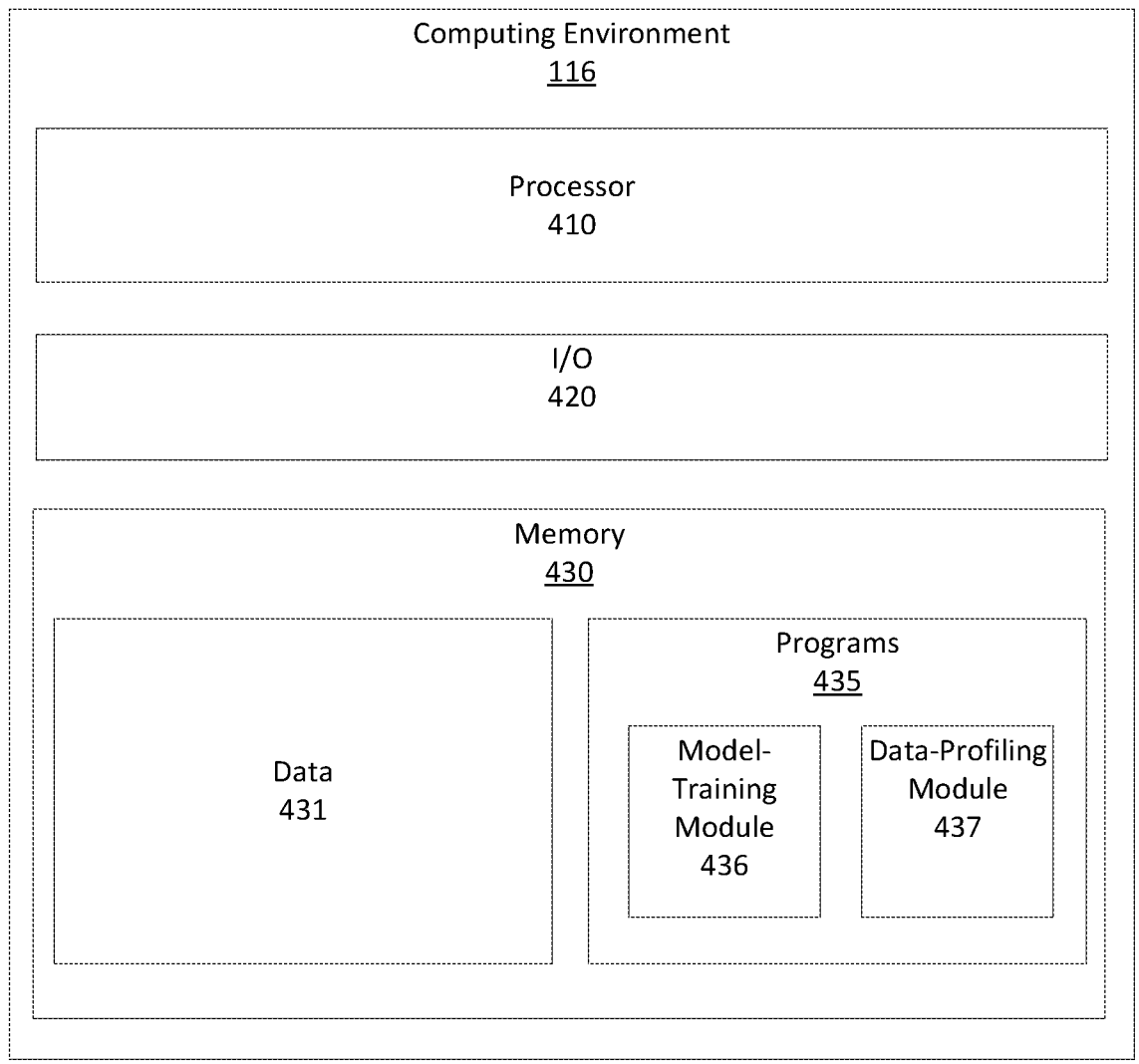
FIG. 4 depicts an exemplary computing environment, consistent with disclosed embodiments.

FIG. 4 depicts an exemplary computing environment 116, consistent with disclosed embodiments. Computing environment 116 may be one of, for example, computing environments 116a, 116b, 116n. Computing environment 116 may be or include a virtual private cloud, a local computing environment (e.g., a personal computer, terminal, kiosk, or workstation), a server, a server cluster, a device (e.g., a mobile device, a tablet, a laptop, etc.), and/or another computing environment.

As shown, computing environment 116 includes one or more processors 410, one or more I/O devices 420, and one or more memory units 430. In some embodiments, some or all components of computing environment 116 may be hosted on a device, a computer, a server, a cluster of servers, or a cloud service. In some embodiments, computing environment 116 is a scalable system configured to efficiently manage resources and enhance security by provisioning computing resources in response to triggering events and terminating resources after completing a task (e.g., a scalable cloud service that spins up and terminates container instances).

FIG. 4 depicts an exemplary configuration of computing environment 116. As will be appreciated by one skilled in the art, the components and arrangement of components included in computing environment 116 may vary. For example, as compared to the depiction in FIG. 4, computing environment 116 may include a larger or smaller number of processors 410, I/O devices 420, or memory units 430. In addition, computing environment 116 may further include other components or devices not depicted that perform or assist in the performance of one or more processes consistent with the disclosed embodiments. The components and arrangements shown in FIG. 4 are not intended to limit the disclosed embodiments, as the components used to implement the disclosed processes and features may vary.

Processor 410 may comprise known computing processors, including a microprocessor. Processor 410 may constitute a single-core or multiple-core processor that executes parallel processes simultaneously. For example, processor 410 may be a single-core processor configured with virtual processing technologies. In some embodiments, processor 410 may use logical processors to simultaneously execute and control multiple processes. Processor 410 may implement virtual machine technologies, or other known technologies to provide the ability to execute, control, run, manipulate, store, etc., multiple software processes, applications, programs, etc. In another embodiment, processor 410 may include a multiple-core processor arrangement (e.g., dual core, quad core, etc.) configured to provide parallel processing functionalities to allow execution of multiple processes simultaneously. One of ordinary skill in the art would understand that other types of processor arrangements could be implemented that provide for the capabilities disclosed herein. The disclosed embodiments are not limited to any type of processor(s) 410. Processor 410 may execute various instructions stored in memory 330 to perform various functions of the disclosed embodiments described in greater detail below. Processor 410 is configured to execute functions written in one or more known programming languages.

I/O devices 420 may include at least one of a display, an LED, a router, a touchscreen, a keyboard, a microphone, a speaker, a haptic device, a camera, a button, a dial, a switch, a knob, a transceiver, an input device, an output device, or another I/O device to perform methods of the disclosed embodiments. I/O devices 420 may be components of an interface of computing environment 116.

Memory 430 may be a volatile or non-volatile, magnetic, semiconductor, optical, removable, non-removable, or other type of storage device or tangible (i.e., non-transitory) computer-readable medium, consistent with disclosed embodiments. As shown, memory 430 may include data 431, including of at least one of encrypted data or unencrypted data. Data 431 may include one or more model indexes, model parameters, model hyperparameters, model codes, data indexes, data vectors, and/or datasets, consistent with disclosed embodiments.

Programs 435 may include one or more programs (e.g., modules, code, scripts, or functions) used to perform methods consistent with disclosed embodiments. Programs may include operating systems (not shown) that perform known operating system functions when executed by one or more processors. Disclosed embodiments may operate and function with computer systems running any type of operating system. Programs 435 may be written in one or more programming or scripting languages. One or more of such software sections or modules of memory 430 may be integrated into a computer system, non-transitory computer-readable media, or existing communications software. Programs 435 may also be implemented or replicated as firmware or circuit logic.

In some embodiments, modules of programs 435 may be configured to generate ("spin up") one or more ephemeral container instances to perform a task and/or to assign a task to a running (warm) container instance, consistent with disclosed embodiments. Modules of programs 435 may be configured to receive, retrieve, and/or generate models, consistent with disclosed embodiments. Modules of programs 435 may be configured to receive, retrieve, and/or generate datasets (e.g., to generate synthetic datasets, data samples, or other datasets), consistent with disclosed embodiments. Modules of programs 435 may be configured to perform operations in coordination with one another.

As shown, programs 435 may include a model-training module 436, data-profiling module 437, and/or other modules not depicted to perform methods of the disclosed embodiments. Model-training module 436 may include, may be configured generate, and/or may be configured to implement any of the models, algorithms, functions, programs, scripts and/or other computing code as disclosed in reference to model-training module 236, above. Data-profiling module 437 may include, may be configured generate, and/or may be configured to implement any of the models, algorithms, functions, programs, scripts and/or other computing code as disclosed in reference to data-profiling module 237, above.

Figure 5:
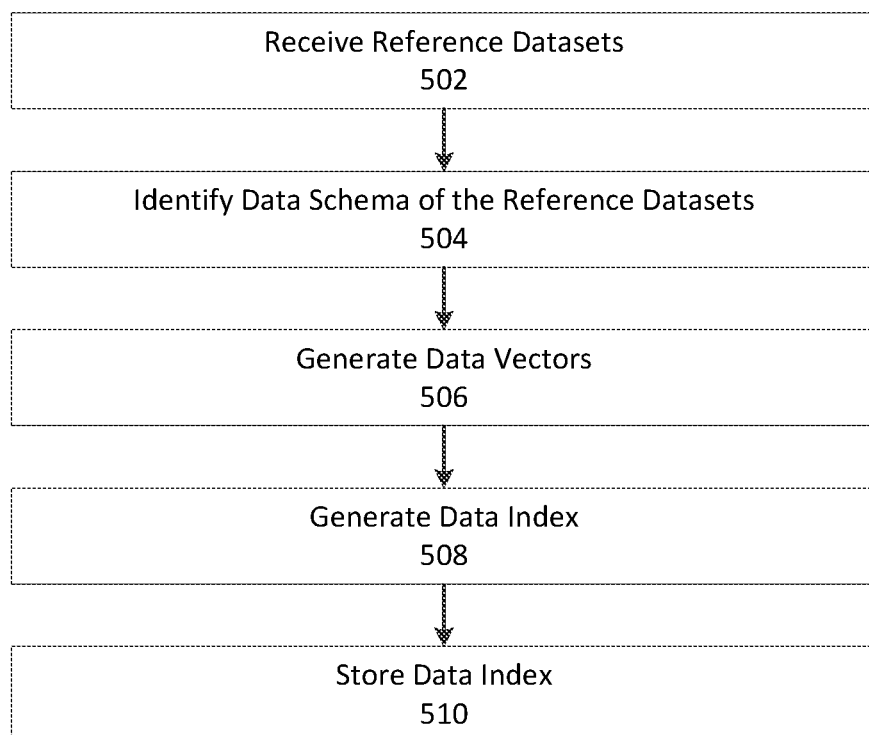
FIG. 5 depicts an exemplary process for profiling data, consistent with disclosed embodiments.

FIG. 5 depicts an exemplary process for profiling data 500, consistent with disclosed embodiments. In some embodiments, data-migration system 110 may perform process 500 using programs 335. One or more of model-training module 336, data-profiling module 337, aggregator 338, migration module 339, or other module of programs 335 may perform operations of process 500, consistent with disclosed embodiments. In some embodiments, data-searching system 106 may perform steps of process 500. One or more of model-training module 236, data-profiling module 237, aggregator 238, searching module 239, or other module of programs 235 may perform operations of process 500, consistent with disclosed embodiments. It should be noted that other components of system 100, including, for example, model optimizer 102, client device 114, and/or one or more computing environments (e.g., computing environment 116a, 116b, 116n) may perform operations of one or more steps of process 500.

Consistent with disclosed embodiments, steps of process 500 may be performed on one or more cloud services using one or more ephemeral container instances. For example, at any of the steps of process 500, data-migration system 110 or data-searching system 106 may generate (spin up) an ephemeral container instance to execute a task, assign a task to an already-running ephemeral container instance (warm container instance), or terminate a container instance upon completion of a task. As one of skill in the art will appreciate, steps of process 500 may be performed as part of an application interface (API) call.

At step 502, data-migration system 110 may receive one or more reference datasets, consistent with disclosed embodiments. In some embodiments, receiving a reference dataset includes retrieving the reference dataset from another computing component. In some embodiments, the reference datasets may be received from client device 114, computing environments 116a, 116b, 116n, databases 118a, 118b, 118n, and/or an external computing component (e.g., via interface 112). In some embodiments, the reference datasets may be received based on a schedule.

In some embodiments, receiving a reference dataset at step 502 includes a receiving a request. In some embodiments, the request includes a command to retrieve one or more reference datasets from another component of system 100. In some embodiments, the request includes a command to retrieve a data vector and/or a data index. In some embodiments, a data vector and/or data index is received at step 502. In some embodiments, data-migration system 110 generates or updates a log file based on the received or retrieved datasets, consistent with disclosed embodiments.

In some embodiments, at step 502, data-migration system transmits a dataset request to a computing component of system 100 (e.g., a computing environment 116a, 116b, 116n or outside system 100) and receives a dataset in response to the request, consistent with disclosed embodiments. The dataset request may be transmitted according to a schedule. The dataset request may be transmitted based on a triggering event, such as receiving a user request via an interface At step 504, data-migration system 110 may identify one or more data schemas corresponding to individual ones of the one or more reference datasets, consistent with disclosed embodiments. Step 504 may include using one or more data-profiling model to identify the data schemas. The data-profiling model may be stored in, for example, model storage 104, data 331, or another data storage.

At step 506, data-migration system 110 may generate data vectors based on the one or more data schemas, consistent with disclosed embodiments. As previously described, the data vectors may include statistical metrics of the sample dataset and information based on the data schema of the sample dataset. Step 506 may include using one or more data-profiling models to generate data vectors. The data-profiling model may be stored in, for example, model storage 104, data 331, or another data storage. Step 506 may include generating metadata (e.g., one or more tags or labels) associated with the data vectors. Step 506 may include performing calculations on the dataset (e.g., converting measurement units, normalizing data values, classifying data values into a category, or other calculations) as before generating the data vectors.

At step 508, data-migration system 110 may generate a data index based on the data vectors, consistent with disclosed embodiments. The data index may include the data vectors and metadata associated with the data vectors. The data index may be a searchable data index, consistent with disclosed embodiments. For example, the data index may be stored as a tree.

At step 510, data-migration system 110 may store the data index, consistent with disclosed embodiments. Storing the data index may include storing the data index in aggregation database 108 and/or one or more data storages (e.g., data 231, data 331, or data 431). Storing the data index may include storing the data vectors. Storing the data index may include generating and/or updating a log based on the data index and storing the log.

It should be noted that steps of process 500 may be repeated. For example, data-migration system 110 may receive an additional dataset and/or an additional data vector and repeat steps of process 500 to update a data index.

Figure 6:
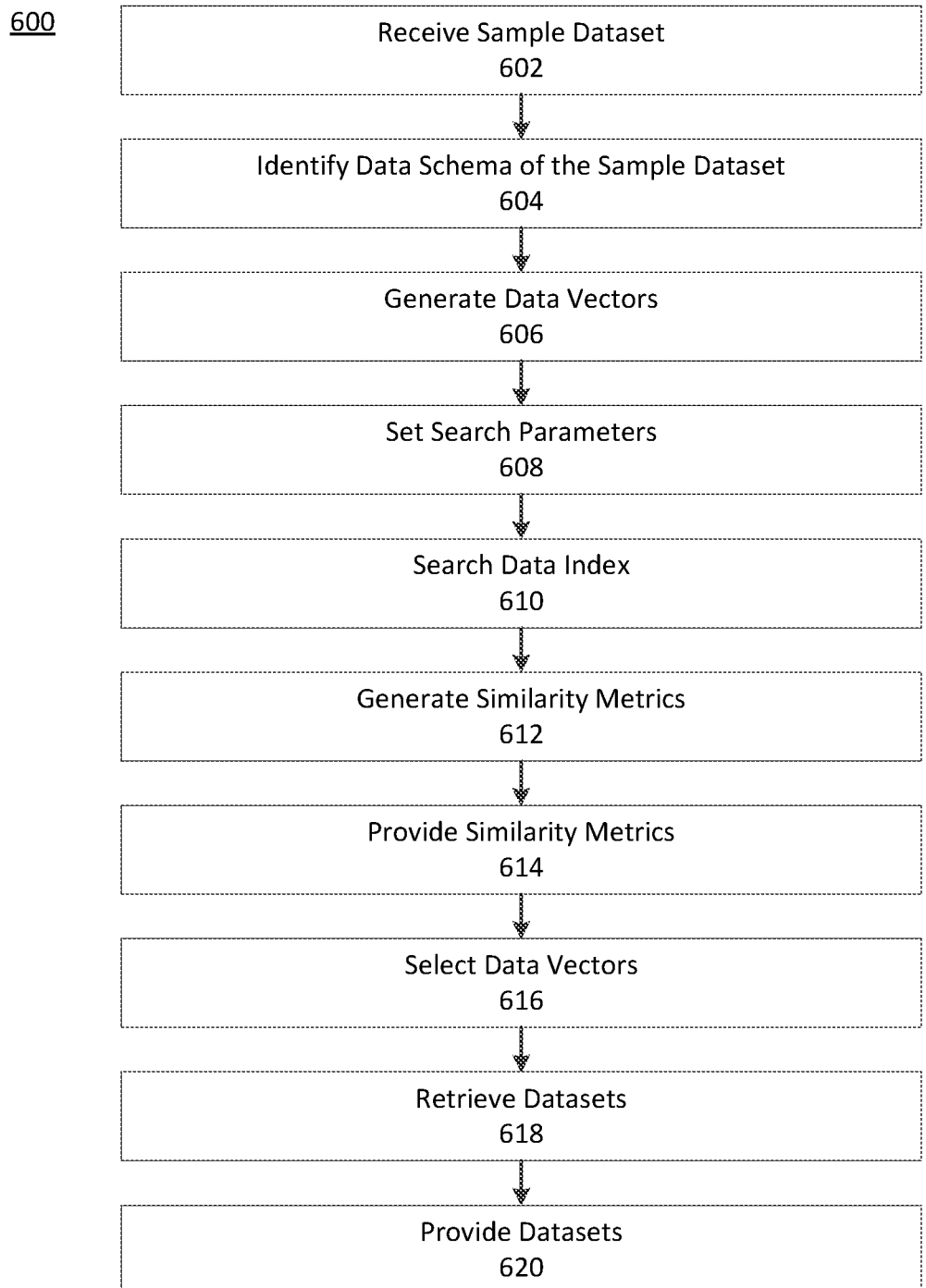
FIG. 6 depicts an exemplary process for searching for data, consistent with disclosed embodiments.

FIG. 6 depicts an exemplary process for searching for data 600, consistent with disclosed embodiments. In some embodiments, data-searching system 106 performs process 600. One or more of model-training module 236, data-profiling module 237, aggregator 238, searching module 239, or other module of programs 235 may perform operations of process 600, consistent with disclosed embodiments. It should be noted that other components of system 100, including, for example, model optimizer 102, client device 114, data-migration system 110, and/or one or more computing environments (e.g., computing environment 116a, 116b, 116n) may perform operations of one or more steps of process 600.

Consistent with disclosed embodiments, steps of process 600 may be performed on one or more cloud services using one or more ephemeral container instances. For example, at any of the steps of process 600, data-migration system 110 or data-searching system 106 may generate (spin up) an ephemeral container instance to execute a task, assign a task to an already-running ephemeral container instance (warm container instance), or terminate a container instance upon completion of a task. As one of skill in the art will appreciate, steps of process 600 may be performed as part of an application interface (API) call.

At step 602, data-searching system 106 may receive a sample dataset, consistent with disclosed embodiments. In some embodiments, receiving a sample dataset includes retrieving the reference sample from another computing component. In some embodiments, the sample dataset is received from data-migration system 110, client device 114, computing environments 116a, 116b, 116n, databases 118a, 118b, 118n, and/or an external computing component (e.g., via interface 112). In some embodiments, receiving a sample dataset at step 602 includes a receiving a request. In some embodiments, the request includes a command to retrieve the sample dataset from another component of system 100. In some embodiments, the request includes a command to retrieve one or more reference datasets from another component of system 100. In some embodiments, the request includes a command to retrieve a data vector and/or a data index. In some embodiments, a data vector and/or data index is received at step 602.

At step 604, data-searching system 106 may identify a data schema of the sample dataset, consistent with disclosed embodiments. Step 604 may include using one or more data-profiling model to identify the data schema. The data-profiling models may be stored in, for example, model storage 104, data 231, or another data storage. As previously described, data-profiling model may include machine-learning models and statistical models to determine the data schema and/or a statistical profile of a dataset (i.e., to profile a dataset). The data-profiling model may include an RNN model, a CNN model, or other machine-learning model. The data-profiling model may include algorithms to determine a data type, key-value pairs, row-column data structure, statistical distributions of information such as keys or values, or other property of a data schema. The data-profiling model may be configured to implement univariate and multivariate statistical methods. The data-profiling model may include a regression model, a Bayesian model, a statistical model, a linear discriminant analysis model, or other classification model configured to determine one or more descriptive metrics of a dataset. For example, the data-profiling model may include algorithms to determine an average, a mean, a standard deviation, a quantile, a quartile, a probability distribution function, a range, a moment, a variance, a covariance, a covariance matrix, a dimension and/or dimensional relationship (e.g., as produced by dimensional analysis such as length, time, mass, etc.) or any other descriptive metric of a dataset. In some embodiments, the data-profiling model may be trained to identify complex data types, i.e. a datatype whose structure may be based on an underlying rule (e.g., a social security number, a longitude, a zip code, an account number, an international telephone number, an address, a license plate number, a driver's license number, a government identification number, a passport number, or the like)

At step 606, data-searching system 106 may generate a sample data vector based on the data schema, consistent with disclosed embodiments. As previously described, the sample data vectors may include statistical metrics of the sample dataset and information based on the data schema of the sample dataset. Step 606 may include using one or more data-profiling models to generate the sample data vector. The data-profiling model may be stored in, for example, model storage 104, data 231, or another data storage. Step 606 may include generating metadata (e.g., one or more tags or labels) associated with the sample data vector. Step 606 may include performing calculations on the sample dataset (e.g., converting measurement units, normalizing data values, classifying data values into a category, or other calculations) as before generating the sample data vector.

At step 608, data-searching system 106 may set search parameters, consistent with disclosed embodiments. In some embodiments, the search parameters may be received at step 602. In some embodiments, step 608 may include sending a request for search parameter to a component of system 100 or a computing component outside system 100 and receiving the search parameters in response to the request. For example, the search parameters may include instructions to search the data index based on a comparison of data vector components representing data schemas of the datasets or data schemas of variables of the dataset (e.g., column data). The search parameters may include instructions to search the data index based on a comparison of data vector components representing statistical metrics of the dataset and/or statistical metrics of variables of the dataset. As an example, the search parameters may first specify to conduct an initial search based on comparisons of data schemas and conduct a search based on comparisons of statistical metrics. In some embodiments, the search parameters may include instructions to search the data index by searching data profiles (data schema and statistical metrics) of the datasets and searching data profiles of variables of the datasets.

At step 610, data-searching system 106 may search a data index comprising stored data vectors, consistent with disclosed embodiments. The search may be based on search parameters, consistent with disclosed embodiments. In some embodiments, the search may be conducted without k-nearest neighbor clustering. A stored vector may correspond to a reference dataset or to a variable of a reference dataset (e.g., a data column).

Step 610 may include identifying the data index. The data index may be stored in, for example, aggregation database 108 or another component of system 100, and data-searching system 106 may identify the data index based on the sample dataset or sample vector (e.g., based on metadata). In some embodiments, the data index may be received at step 602. In some embodiments, identifying a data index may be performed based on user inputs received at step 610 (e.g., receiving an instruction via interface 112). In some embodiments, the data index may be identified based on metadata of associated with the sample data vector.

At step 612, data-searching system 106 may generate one or more similarity metrics between the stored data vectors and the sample data vector, consistent with disclosed embodiments. As previously described, the similarity metric may represent a measure of similarity between data. For example, the similarity metric may be based on a covariance matrix, a variance, a frequency of overlapping values, or other measure of statistical similarity. The similarity metric may include a percent match and/or a confidence interval. In some embodiments, data-searching system 106 may generate the similarity metrics using one or more data-profiling models, consistent with disclosed embodiments.

In some embodiments, a similarity metric may include a likelihood that a reference dataset derives from sample dataset. In some embodiments, a similarity metric may include a likelihood that the sample dataset derives from a reference dataset. For example, a dataset may derive from another dataset when the data schema and/or data values match according to a threshold or frequency. As an example, a small dataset may be a subset of a large dataset, i.e. it derives from the larger dataset. As another example, one dataset may contain some overlapping values with another dataset and both may contain values that are unique from the other dataset. In that example, either dataset may be said to derive from the other dataset.

At step 614, data-searching system 106 may provide the one or more similarity metrics, consistent with disclosed embodiments. Providing the similarity metrics at step 614 may include displaying the similarity metrics at an interface (e.g., interface 112, a display of I/O devices 220, and/or a display of I/O devices 320). Providing the similarity metrics at step 614 may include transmitting the similarity metrics to another component of system 100 (e.g., to client device 114) and/or to a computing component outside system 100 (e.g., via interface 112).

At step 616, data-searching system 106 may select one or more data vectors, consistent with disclosed embodiments. In some embodiments, selecting data vectors may be based on the similarity metrics and one or more predetermined selection criteria. The predetermined selection criteria may be received from a user (e.g., at step 602 or as a user-input received via an interface at step 616). The selection criteria may include a command to select any data vectors with similarity criteria falling within a range (e.g., any data vectors between 50% to 90% match). Selecting data vectors may include receiving metadata (e.g., one or more tags or labels) associated with the data vectors.

At step 618, data-searching system 106 may retrieve one or more datasets associated with the selected data vectors, consistent with disclosed embodiments. In some embodiments, data-searching system 106 retrieves the datasets from one of data 231, aggregation database 108, data-migration system 110, computing environments 116a, 116b, 116n, databases 118a, 118b, 118n, and/or a computing outside system 100 (e.g., via the interface 112). Retrieving a dataset may be based on the metadata of the selected data vectors. Retrieving a dataset may be include identifying a location (e.g., a database, an internet address) or an identifier of the dataset based on a log and the selected data vector. In some embodiments, the log may be stored in data aggregation database 108.

At step 620, data-searching system 106 may provide the datasets associated with the selected data vectors, consistent with disclosed embodiments. Providing the datasets at step 620 may include displaying the datasets at an interface (e.g., interface 112, a display of I/O devices 220, and/or a display of I/O devices 320). Providing the datasets at step 620 may include transmitting the datasets to another component of system 100 (e.g, to client device 114) and/or to a computing component outside system 100 (e.g., via interface 112). Providing the datasets may include storing the datasets in a data storage. Providing the datasets may include providing a link to the datasets. Providing the datasets may include providing a compressed file comprising one or more datasets. Providing the datasets may include sending a request to data-migration system 110 to transfer a dataset to a computing component, consistent with disclosed embodiments.

Example Implentation: Conducting a search based on a sample dataset in .CSV-format comprising public health indicators.

As an illustrative example, a researcher may be conducting a meta-analysis of a plurality of health studies to identify health indicators that predict a health outcome, such as risk factors that contribute to heart attacks. The researcher may use data-searching system 106 to expand the study by identifying additional data sources to include in the study. The researcher may possess an initial sample dataset. Advantageously, the disclosed system and method provide appropriate datasets to address the researcher's goal of expanding the study; because the system provides datasets that are similar to the sample dataset based on the structure and content of sample dataset. In contrast, conventional search methods may identify datasets that merely happen to contain keywords or other sequences of characters which overlap with the sample datasets. Hence, a conventional search may return redundant or dissimilar datasets that cannot be included in the meta-analysis.

In the example, following steps of process 600 beginning with step 602, data-searching system 100 may receive a sample dataset from the researcher's device (e.g., client device 114), consistent with disclosed embodiments. The sample dataset may be a .CSV file. Column headers may include an identifier (e.g., an anonymous patient ID, a social security number, etc.), a data of birth, a date associated with the measurement of other parameters, and one or more other parameters. The parameters may include a current residential address, a sex, a wealth indicator (e.g., home equity, income, debt), one or more health indicators (e.g., a cholesterol measurement, a resting heart rate, a percent body fat, a weight, a height, a smoking status, or the like), and a health event (e.g., a heart attack). Row data may include records associated individual persons.

In the example, data-searching system 106 identifies a data schema of the sample dataset (step 604), consistent with disclosed embodiments. Here, the data schema may include column headers. In some cases, the columns may be unlabeled and a data-profiling model may identify a data type and provide a label (e.g., provide a column header). Identifying the data schema may include identifying complex data types using a trained model, consistent with disclosed embodiments.

Next, data-searching system 106 generates a sample data vector of the sample dataset (step 606). As an example, generating the sample data vector may include translating the residential address into Global Positioning System coordinates and developing statistical metrics of the GPS coordinates (e.g., the centroid of the GPS coordinates, parameters of a fit to a Poisson distribution or other statistical distribution of the GPS coordinates). The sample data vector may then include the statistical metrics of the GPS coordinates. In addition, generating the sample data vector may include developing a mean, median, and variance of the age of individuals in the dataset based on the date of birth and a data associated with the measurement of parameters. The sample data vector may include the mean, median, and variance of the age.

Consistent with disclosed embodiments, in the example, data vectors may be generated using machine learning models (e.g., a data-profiling model) and have no human-understandable interpretation. For example, a machine-learning model comprising an autoencoder model, a VAE model, and/or other model may perform feature embedding and generate vectors based on the identified features, consistent with disclosed embodiments.

Data-searching system 106 may set the search parameters (step 608). For example, the system may receive a set of instructions from client device 114, the instructions be based on user inputs. The instructions might specify that the search should be performed over a data index stored in aggregation database 108. The instructions may include a command to assign a weight of 0.8 to a search parameter associated with the data schema (here, column labels). The instructions may further include a command to assign a weight of 0.05 to search parameters corresponding to each of four statistical metrics (e.g., the GPS centroid, the mean age, the median age, and the variance of the age). Alternatively, in the example, the search parameters may be determined using a machine-learning model.

Data-searching system 106 may then identify a data index and perform a search of the data index (step 610), consistent with disclosed embodiments. For example, the data index may be stored in aggregation database 108 and include stored data vectors associated with a plurality of public health datasets from a plurality of sources (i.e., systems). The systems may include systems associated with a university, a research institution, an agency (e.g., Center for Disease Control), a health care provider (e.g., a hospital), an insurance provider, the internet (e.g., a dataset retrieved from the internet by data-migration system 110), and/or other systems.

Data-searching system 106 may generate similarity metrics based on the search (step 612), consistent with disclosed embodiments. For example, the similarity metric may indicate a "percent match" between one or more stored data vectors and the sample data vector. The stored and sample data vectors may include statistical metrics based on complex data types. In a search, data-searching system 106 may identify two datasets that share the same data schema as the sample data vector. Data-searching system 106 may give a first one of these datasets a 100% match because it has the same GPS centroid, mean age, median age, and variance of the age as the sample dataset, i.e., data-searching system 106 found the same dataset as the sample dataset. However, data-searching system 106 may give the second one of these datasets an 80% match because it has a different GPS centroid, mean age, median age, and variance of the age. In addition, data-searching system 106 may identify a third dataset has a 75% match because it shares some properties of the data schema and has different statistical metrics.

In the example, data-searching system 106 may provide the similarity metrics to the researcher's device (step 614). The device (e.g., client device 114) may display the metrics via an interface. The researcher may then be able to provide user inputs to reject the 100%-match data vector and select the 80%- and 75%-match data vector (step 618). For example, the researcher may be able to click an icon on the interface to select a data vector. Based on the selection, data-searching system 106 may then retrieve datasets associated with the selected data vector and provide the retrieved datasets to the user (steps 618 and 620). For example, data-searching system 106 may determine that a vector corresponds to a dataset stored in computing environment 116a and retrieve or send a request to receive the corresponding dataset from computing environment 116a. The interface may display an option to download the retrieved dataset, and may transmit the received dataset to the a researcher's local device when the researcher selects the option.

Systems and methods disclosed herein involve unconventional improvements over conventional data processing approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various functions, scripts, programs, or modules can be created using a variety of programming techniques. For example, programs, scripts, functions, program sections or program modules can be designed in or by means of languages, including JAVASCRIPT, C, C++, JAVA, PHP, PYTHON, RUBY, PERL, BASH, or other programming or scripting languages. One or more of such software sections or modules can be integrated into a computer system, non-transitory computer-readable media, or existing communications software. The programs, modules, or code can also be implemented or replicated as firmware or circuit logic.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for searching data, comprising:
at least one memory storing instructions; and
one or more processors that execute the instructions to perform operations comprising:
   receiving a search request comprising a sample dataset and a vector similarity threshold of similarity between vectors;
   in response to the received search request, performing:
      identifying, using a data-profiling model comprising a machine learning model configured to compute statistical metrics descriptive of the sample dataset, a data schema of the sample dataset;
      computing, using the data-profiling model, statistical metrics describing at least one statistical attribute of data within the sample dataset;
      generating a sample data vector comprising the computed statistical metrics of the sample dataset and information describing the data schema of the sample dataset;
      searching a data index comprising a plurality of stored data vectors corresponding to a plurality of reference datasets, the stored data vectors comprising statistical metrics of data within the reference datasets and information describing corresponding data schema of the reference datasets, wherein searching the data index comprises:
         performing data schema comparisons between the data schema of the sample data vector and data schemas of the stored vectors; and
         performing statistical metric comparisons between the computed statistical metrics of the sample data vector and statistical metrics of the stored vectors;
      generating, based on both the data schema comparisons and the statistical metric comparisons, one or more similarity metrics of the sample dataset to individual ones of the reference datasets;
      determining, based on the one or more similarity metrics, at least a portion of the reference datasets having at least one data vector satisfying the vector similarity threshold; and
      returning, as a result of the received search request, the at least a portion of the reference datasets.

2. The system of claim 1, the operations further comprising:
   receiving a new reference dataset;
   identifying a data schema of the new reference dataset;
   generating a new reference data vector comprising statistical measures of the new reference dataset; and
   updating the data index based on the new reference data vector.

3. The system of claim 1, the operations further comprising:
   receiving, by an aggregator, the reference datasets;
   identifying, by the aggregator, the corresponding data schema of the reference datasets;
   generating, by the aggregator, the stored data vectors;
   generating, by the aggregator, the data index; and
   storing the data index in an aggregation database.

4. The system of claim 3, wherein:
the operations further comprise transmitting, to one or more computing environments, a request for the reference datasets; and
the reference datasets are received from individual ones of the computing environments.

5. The system of claim 1, wherein computing statistical metrics describing at least one statistical attribute of the sample dataset comprises applying a model to the sample dataset, the model comprising at least one of: a regression model, a Bayesian model, a statistical model, a linear discriminant analysis model, or a machine learning model.

6. The system of claim 1, wherein searching the data index further comprises searching data profiles of variables of the reference datasets.

7. The system of claim 1, wherein at least one of the stored data vectors corresponds to a data column of one of the reference datasets.

8. The system of claim 1, wherein at least one of the stored data vectors comprises statistical metrics of a plurality of stored data vectors corresponding to data columns of one of the reference datasets.

9. The system of claim 1, wherein the sample data vector corresponds to a data column of the sample dataset.

10. The system of claim 1, wherein the sample data vector comprises statistical metrics of a plurality of data column data vectors comprising statistical metrics of respective data columns of the sample dataset.

11. The system of claim 1, wherein:
the sample data vector is a first sample data vector;
the operations further comprise generating a second sample data vector comprising statistical metrics of the sample dataset and information based on the data schema of the sample dataset; and
computing the similarity metrics is based on the second sample data vector.

12. The system of claim 1, wherein the similarity metrics are based on a weight associated with the data schema of the sample dataset.

13. The system of claim 1, wherein identifying the data schema comprises classifying a complex data type.

14. The system of claim 1, wherein:
performing the statistical metric comparisons comprises comparing individual statistical metrics of the sample dataset to individual statistical metrics of the reference datasets; and
the individual statistical metrics of the sample dataset and the individual statistical metrics of the reference datasets comprise at least one of: an average, a standard deviation, a range, a moment, a variance, a covariance, or a covariance matrix.

15. The system of claim 1, wherein
the operations further comprise transmitting the generated one or more similarity metrics to a client device.

16. The system of claim 1, wherein searching the data index comprises fuzzy searching.

17. The system of claim 1, wherein at least one of the similarity metrics represents a likelihood that the sample data derives from one of the reference datasets.

18. A method for searching data, the method comprising the following operations performed by one or more processors:
receiving a search request comprising a sample dataset and a vector similarity threshold of similarity between vectors;
in response to the received search request, performing:
identifying, using a data-profiling model comprising a machine learning model configured to compute statistical metrics descriptive of the sample dataset, a data schema of data within the sample dataset;
computing, using the data-profiling model, statistical metrics describing at least one statistical attribute of the sample dataset;
generating a sample data vector comprising the computed statistical metrics of the sample dataset and information describing the data schema of the sample dataset;
searching a data index comprising a plurality of stored data vectors corresponding to a plurality of reference datasets, the stored data vectors comprising statistical metrics of data within the corresponding reference datasets and information describing corresponding data schema of the reference datasets, wherein searching the data index comprises:
performing data schema comparisons between the data schema of the sample data vector and data schemas of the stored vectors; and
performing statistical metric comparisons between the computed statistical metrics of the sample data vector and statistical metrics of the stored vectors;
generating, based on both the data schema comparisons and the statistical metric comparisons, one or more similarity metrics of the sample dataset to individual ones of the reference datasets;
determining, based on the one or more similarity metrics, at least a portion of the reference datasets having at least one data vector satisfying the vector similarity threshold; and
returning, as a result of the received search request, the at least a portion of the reference datasets.

19. A system for searching data, comprising:
at least one memory storing instructions; and
one or more processors that execute the instructions to perform operations comprising:
receiving, by an aggregator, a plurality of reference datasets;
identifying, by the aggregator, data schema corresponding to the reference datasets;
generating, by the aggregator, a plurality of stored data vectors corresponding to the reference datasets, the stored data vectors comprising statistical metrics of data within the reference datasets and information describing the corresponding data schema of the reference datasets;
generating, by the aggregator, a data index comprising the stored data vectors;
storing the data index in an aggregation database;
receiving, via an interface, a search request comprising a sample dataset and a vector similarity threshold of similarity between vectors;
in response to the received search request, performing:
identifying, using a data-profiling model comprising a machine learning model configured to compute statistical metrics descriptive of the sample dataset, a data schema of the sample dataset;
computing, using the data-profiling model, statistical metrics describing at least one statistical attribute of the sample dataset;
generating, using the data-profiling model, a sample data vector comprising the computed statistical metrics of the sample dataset and information describing the data schema of the sample dataset;
searching the data index based on the sample data vector, the searching comprising:
performing data schema comparisons between the data schema of the sample data vector and data schemas of the stored vectors; and performing statistical metric comparisons between the computed statistical metrics of the sample data vector and statistical metrics of the stored vectors;

generating, based on both the data schema comparisons and the statistical metric comparisons, one or more similarity metrics of the sample dataset to individual ones of the reference datasets;

determining, based on the one or more similarity metrics, at least a portion of the reference datasets having at least one data vector satisfying the vector similarity threshold of the user input; and returning, as a result of the received search request, the at least a portion of the reference datasets.

* * * * *